(12) United States Patent
Tanaka et al.

(10) Patent No.: US 8,897,917 B2
(45) Date of Patent: Nov. 25, 2014

(54) AUTONOMOUS MOBILE DEVICE

(75) Inventors: Shoji Tanaka, Kyoto (JP); Tsuyoshi Nakano, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 846 days.

(21) Appl. No.: 13/121,995

(22) PCT Filed: Aug. 25, 2009

(86) PCT No.: PCT/JP2009/004084
§ 371 (c)(1),
(2), (4) Date: Mar. 31, 2011

(87) PCT Pub. No.: WO2010/038353
PCT Pub. Date: Apr. 8, 2010

(65) Prior Publication Data
US 2011/0178669 A1 Jul. 21, 2011

(30) Foreign Application Priority Data

Oct. 1, 2008 (JP) .................................. 2008-256663
Oct. 6, 2008 (JP) .................................. 2008-259402

(51) Int. Cl.
| | | |
|---|---|---|
| G05B 19/04 | (2006.01) | |
| G05B 19/18 | (2006.01) | |
| G05B 15/00 | (2006.01) | |
| G05B 19/00 | (2006.01) | |
| G05D 1/00 | (2006.01) | |
| G05D 3/00 | (2006.01) | |
| G06F 17/00 | (2006.01) | |
| G01C 22/00 | (2006.01) | |
| G05D 1/02 | (2006.01) | |

(52) U.S. Cl.
CPC ............ *G05D 1/0088* (2013.01); *G05D 1/0272* (2013.01)

USPC .......... 700/253; 700/250; 700/251; 700/252; 700/255; 700/257; 700/258; 700/264; 701/2; 701/23; 701/25; 701/26; 701/408; 701/409; 701/410; 701/411; 701/445; 701/520

(58) Field of Classification Search
CPC .......... B25J 9/1689; B25J 9/161; B25J 9/162; B25J 9/1666; G05D 1/0044; G05D 1/0246; G05D 1/0282; G05D 1/0038; G05D 2201/0207; G05D 1/0285; G05D 1/0287; G05D 1/0225; G05D 1/0088; G05D 1/0024; G05D 1/0274; G05D 1/0278; G05D 2201/0209; G05D 1/0251; G05D 2201/0211; G05D 2201/00; G05D 1/027; G05D 1/0272; G05D 1/0231; G05D 1/0234; G05D 1/0242; G05D 1/0248; G05D 2201/0215; G05D 2201/0208; G05B 2219/33051; G05B 2219/35472; G05B 2219/40442; G05B 2219/40161; G05B 2219/40169; G05B 2219/35506; G01C 21/12; Y10S 901/50; Y10S 901/01; Y10S 901/46; Y10S 901/47; G06N 3/008

See application file for complete search history.

(56) References Cited

U.S. PATENT DOCUMENTS

| | | | |
|---|---|---|---|
| 6,321,158 B1* | 11/2001 | DeLorme et al. ............ 701/426 |
| 6,667,592 B2* | 12/2003 | Jacobs et al. ............ 318/568.12 |
| 6,845,297 B2* | 1/2005 | Allard ........................ 700/259 |
| 7,054,716 B2* | 5/2006 | McKee et al. ............... 700/245 |
| 7,085,624 B2* | 8/2006 | Aldred et al. ............... 700/253 |
| 7,684,894 B2 | 3/2010 | Sakai et al. | |
| 7,738,883 B2* | 6/2010 | Hull ........................... 455/456.3 |
| 2005/0182518 A1* | 8/2005 | Karlsson ...................... 700/253 |
| 2006/0184274 A1 | 8/2006 | Sakai et al. | |
| 2007/0156286 A1* | 7/2007 | Yamauchi .................... 700/245 |
| 2007/0198129 A1* | 8/2007 | Koselka et al. .............. 700/245 |
| 2007/0262884 A1* | 11/2007 | Goncalves et al. ...... 340/995.24 |
| 2007/0293985 A1 | 12/2007 | Myeong et al. | |
| 2008/0009965 A1* | 1/2008 | Bruemmer et al. .......... 700/245 |
| 2008/0027591 A1* | 1/2008 | Lenser et al. .................... 701/2 |
| 2008/0294288 A1* | 11/2008 | Yamauchi .................... 700/258 |
| 2009/0234499 A1* | 9/2009 | Nielsen et al. ............... 700/250 |

FOREIGN PATENT DOCUMENTS

| | | |
|---|---|---|
| JP | 07-129238 A | 5/1995 |
| JP | 10-143243 A | 5/1998 |
| JP | 2004-280451 A | 10/2004 |
| JP | 2006-242978 A | 9/2006 |
| JP | 2007-257274 A | 10/2007 |
| JP | 2007-322138 A | 12/2007 |
| JP | 2008-004078 A | 1/2008 |
| JP | 2009-053561 A | 3/2009 |
| KR | 10-2008-0029239 A | 4/2008 |

OTHER PUBLICATIONS

Official Communication issued in corresponding International Application PCT/JP2009/004084, issued on May 10, 2011. Official Communication issued in corresponding Japanese Patent Application No. 2008-256663, mailed on Nov. 13, 2012.

Official Communication issued in International Patent Application No. PCT/JP2009/004084, mailed on Nov. 2, 2009.

\* cited by examiner

*Primary Examiner* — Khoi Tran
*Assistant Examiner* — Bao Long T Nguyen

(74) *Attorney, Agent, or Firm* — Keating & Bennett, LLP

(57) ABSTRACT

An electronic controller defining an autonomous mobile device includes a self-location estimation unit to estimate a self-location based on a local map that is created according to distance/angle information relative to an object in the vicinity and the travel distance of an omni wheel, an environmental map creation unit to create an environmental map of a mobile area based on the self-location and the local map during the guided travel with using a joystick, a registration switch to register the self-location of the autonomous mobile device as the position coordinate of the setting point when the autonomous mobile device reaches a predetermined setting point during the guided travel, a storage unit to store the environmental map and the setting point, a route planning unit to plan the travel route by using the setting point on the environmental map stored in the storage unit, and a travel control unit to control the autonomous mobile device to autonomously travel along the travel route.

2 Claims, 22 Drawing Sheets

Fig.10

$$\begin{pmatrix} X_{from} \\ Y_{from} \\ \theta_{from} \\ 1 \end{pmatrix} = \begin{pmatrix} \cos(\Delta\theta) & -\sin(\Delta\theta) & 0 & \Delta x \\ \sin(\Delta\theta) & \cos(\Delta\theta) & 0 & \Delta y \\ 0 & 0 & 1 & \Delta\theta \\ 0 & 0 & 0 & 1 \end{pmatrix} \begin{pmatrix} X_{to} \\ Y_{to} \\ \theta_{to} \\ 1 \end{pmatrix} \quad \cdots (1)$$

$$\begin{pmatrix} X_{to} \\ Y_{to} \\ \theta_{to} \\ 1 \end{pmatrix} = \begin{pmatrix} \cos(\Delta\theta) & -\sin(\Delta\theta) & 0 & \Delta x \\ \sin(\Delta\theta) & \cos(\Delta\theta) & 0 & \Delta y \\ 0 & 0 & 1 & \Delta\theta \\ 0 & 0 & 0 & 1 \end{pmatrix}^{-1} \begin{pmatrix} X_{from} \\ Y_{from} \\ \theta_{from} \\ 1 \end{pmatrix} \quad \cdots (2)$$

PROVIDED THAT $$\begin{pmatrix} \cos(\Delta\theta) & -\sin(\Delta\theta) & 0 & \Delta x \\ \sin(\Delta\theta) & \cos(\Delta\theta) & 0 & \Delta y \\ 0 & 0 & 1 & \Delta\theta \\ 0 & 0 & 0 & 1 \end{pmatrix}^{-1} \text{IS THE CONVERSION MATRIX}$$

$$\begin{pmatrix} X_{from} \\ Y_{from} \\ \theta_{from} \\ 1 \end{pmatrix} \text{IS THE CONVERSION SOURCE COORDINATE VALUE}$$

$$\begin{pmatrix} X_{to} \\ Y_{to} \\ \theta_{to} \\ 1 \end{pmatrix} \text{IS THE CONVERSION DESTINATION COORDINATE VALUE}$$

$\Delta\theta = \theta_{from} - \theta_{to}$

HERE, $\theta$ IS THE POSTURE OF THE AUTONOMOUS MOBILE DEVICE $$\begin{pmatrix} \Delta x \\ \Delta y \\ 1 \end{pmatrix} = \begin{pmatrix} \cos(\Delta\theta) & -\sin(\Delta\theta) & X_{from} \\ \sin(\Delta\theta) & \cos(\Delta\theta) & Y_{from} \\ 0 & 0 & 1 \end{pmatrix} \begin{pmatrix} -X_{to} \\ -Y_{to} \\ 1 \end{pmatrix}$$

Fig.14
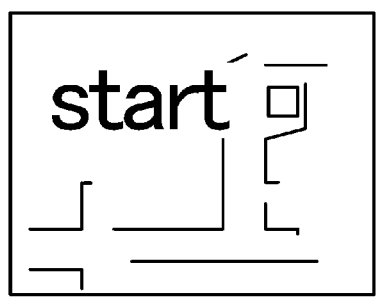
PARTIAL MAP I
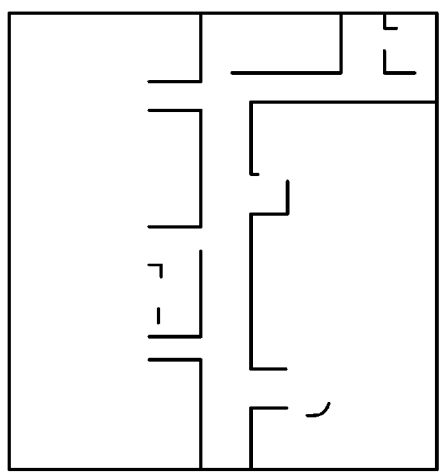
PARTIAL MAP II
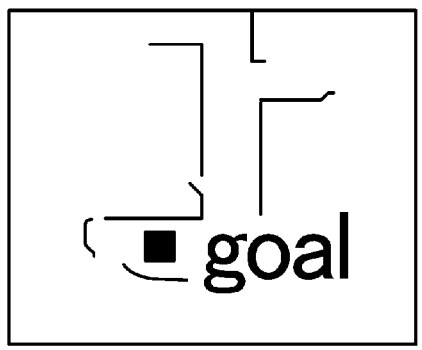
☐ START POINT
■ GOAL POINT
PARTIAL MAP III

AUTONOMOUS MOBILE DEVICE

BACKGROUND OF THE INVENTION

1. Field of the Invention

The present invention relates to an autonomous mobile device which plans a travel route and autonomously travels along the travel route.

2. Description of the Related Art

A conventional autonomous mobile device autonomously travels in an ambient environment. In order for an autonomous mobile device to autonomously travel in the ambient environment, an environmental map showing an area with objects (obstacles) and an area without objects within the travel space is required. Various methods have been proposed as the method of acquiring this kind of environmental map. Here, Japanese Patent Application Laid-open No. H10-143243 discloses technology for representing the ambient environment as a map using a landmark. With this technology, for example, if a mobile area is an office, the landmark is set at positions where the autonomous mobile robot is able to pass through such as corners and branching points of a hallway, center of the room, entrance and exits of doors to and from rooms, and so on. Meanwhile, SLAM (Simultaneous Localization and Mapping) is known as technology for estimating a self-location and creating the environmental map, in real time, while traveling. Here, Japanese Patent Application Laid-open No. H7-129238 discloses a mobile robot which uses SLAM to generate a topographic map (environmental map) based on topographic data obtained as a result of measuring distances using a laser range finder (or a camera).

In the technology of creating an environmental map using landmarks described in the Japanese Patent Application Laid-open No. H10-143243, there is considerable burden on the user for setting the landmarks and performing other operations, and much time and effort (work, man-hours) are required to create the environmental map. Meanwhile, in the method of creating the environmental map by using SLAM, for example, when attempting to set setting points (for instance, starting point, target pass-through point, goal point) on an environmental map which was prepared in advance, there is a possibility that such setting points will be displaced in comparison to their actual positions. Thus, there may be cases where it is necessary to match the setting points with the actual environment.

Moreover, the following problems have been indicated in the method of creating an environmental map by using SLAM.

1. There are cases where an inconsistency arises in the created environmental map due to the accumulation of measurement errors. In particular, there are cases where the start portion and the end portion do not coincide upon creating a circular environmental map (so-called circular route problem).

2. When the layout of the mobile area is partially changed, it is necessary to recreate the entire environmental map.

SUMMARY OF THE INVENTION

In view of such problems, preferred embodiments of the present invention provide an autonomous mobile device capable of creating, with less burden, a highly reliable environmental map including a setting point on the environmental map and performing more accurate autonomous travel with the environmental map.

Moreover, preferred embodiments of the present invention provide an autonomous mobile device capable of resolving the inconsistency in the environmental map caused by the accumulation of measurement errors, and flexibly dealing with partial changes to the layout of the mobile area.

An autonomous mobile device according to a preferred embodiment of the present invention includes an object information acquisition unit to acquire position information on an object existing around the autonomous mobile device, a local map creation unit to create a local map of surroundings of the autonomous mobile device based on the position information on the object acquired by the object information acquisition unit, a moving unit to move the autonomous mobile device, and a self-location estimation unit to estimate a self-location based on the local map created by the local map creation unit and a travel distance of the moving unit, wherein the autonomous mobile device further includes a guiding unit to guide the autonomous mobile device by driving the moving unit based on an operation of a user, an environmental map creation unit to create an environmental map of a mobile area, during the guiding by the guiding unit, based on the self-location estimated by the self location estimation unit and the local map, a teaching unit to teach to register, during the guiding by the guiding unit, the self-location of the autonomous mobile device when the autonomous mobile device is positioned at a predetermined setting point as a position coordinate of the setting point, a storage unit to store the environmental map and the setting point, a route planning unit to plan a travel route by using the setting point on the environmental map stored in the storage unit, and a controller to control the moving unit so that the autonomous mobile device autonomously travels along the travel route planned by the route planning unit.

According to the autonomous mobile device of a preferred embodiment of the present invention, an environmental map is created while the autonomous mobile device is being guided according to the user's operation, and, when the autonomous mobile device is guided and reaches a predetermined setting point (for example, a candidate to be become a goal such as in front of an elevator), the actual self-location at such time is registered as the position coordinate of the setting point on the environmental map. Thus, it is possible to create an environmental map including a setting point that is not displaced relative to the actual mobile environment just by registering the setting point while guiding the autonomous mobile device within the mobile area. Moreover, according to the autonomous mobile device of a preferred embodiment of the present invention, the travel route is planned with the setting point on the environmental map that was created and stored, and the moving unit is controlled so that the autonomous mobile device autonomously travels along the travel route. Thus, for example, if the travel route is planned with the setting point as the goal point, it is possible to plan a travel route with minimal deviation from the actual mobile area, and travel autonomously with favorable reproducibility. Consequently, according to the autonomous mobile device of a preferred embodiment of the present invention, it is possible to easily create a highly reliable environmental map including a setting point on the environmental map, and perform more accurate autonomous travel by using the environmental map.

Preferably, the autonomous mobile device according to a preferred embodiment of the present invention further includes a differential map creation unit to create a differential map showing an object change level within the mobile area, upon the autonomous traveling along the travel route, and a dynamic environmental map creation unit to create a dynamic environmental map based on an addition result of the differential map created by the differential map creation unit and the environmental map, upon the autonomous traveling along the travel route, wherein the self-location estimation unit compares each of the environmental map and the dynamic environmental map with the local map, and estimates the self-location based on the comparison result upon the autonomous traveling along the travel route, and wherein the differential map creation unit updates the differential map based on the addition result of the dynamic environmental map and the local map, and the difference with regard to the environmental map.

In this case, the differential map showing an object change level within the mobile area is created upon autonomously traveling along the travel route, and the dynamic environmental map is created based on the addition result of the environmental map and the differential map. Moreover, the environmental map and the dynamic environmental map are respectively compared with the local map, and the self-location is estimated based on the comparison result. Since only the differential map is updated during the autonomous travel and a highly reliable environmental map is retained without being overwritten, for instance, if the estimated self-location is displaced from the actual self-location, it is possible to prevent a highly reliable environmental map from being erroneously overwritten. Moreover, for example, even if the estimated self-location is temporarily displaced from the actual self-location, it can be recovered. Moreover, if there is any change to the environment within the mobile area, such as a mobile object passing through the vicinity of the autonomous mobile device or a new object being placed on the passage, such change is extracted as a differential map and reflected in the dynamic environmental map. Thus, it is possible to deal with environmental changes of the mobile environment.

In the autonomous mobile device according to a preferred embodiment of the present invention, preferably, the teaching unit teaches, together with the registration of the setting point, to register attribute information of the setting point. As a result, attribute information (for instance, a front of an elevator, a front of a conference room, a front of a fire escape or the like) of a setting point can be registered by being associated with that setting point.

The autonomous mobile device according to a preferred embodiment of the present invention includes an acquisition unit to acquire position information on an object in the vicinity, a creation unit to create a plurality of partial maps configuring an environmental map of a mobile area based on the position information on the object acquired by the acquisition unit, a setting unit to set connection points that connect the plurality of partial maps when the plurality of partial maps are created by the creation unit, a selection unit to select the connection points of each of the mutually connected partial maps from among the connection points set by the setting unit, and a connecting unit to set forth a connection relation between the connection points of the partial map selected by the selection unit.

According to the autonomous mobile device of a preferred embodiment of the present invention, a plurality of independent partial maps is created, and connection points are set upon creating the partial maps. Subsequently, the connection points for connecting the partial maps are selected, and the connection relation between the connection points is set forth. Accordingly, since the accumulation of errors can be prevented by dividing the environmental map of the overall mobile environment into independent partial maps, it is possible to resolve the inconsistency of the environmental map caused by the accumulation of errors. Moreover, since the connection relation between the connection points included in the partial map is set forth in the respective partial maps, it is possible to change to a different partial map according to the connection relation. In addition, since the environmental map of the overall mobile environment is managed by being dividing into partial maps, if the layout of the mobile area is partially changed, it is possible to recreate only the partial map in which the layout was changed and replaced only the recreated partial map. Accordingly, it is possible to flexibly deal with partial changes to the layout of the mobile area.

Preferably, the autonomous mobile device according to a preferred embodiment of the present invention further includes an extraction unit to extract and thin a movable area for each of the plurality of partial maps created by the creation unit, a topological map creation unit to search for a branching point of the movable areas thinned by the extraction unit for each of the plurality of partial maps, and create a topological map showing a connection relation of the branching points, a search unit to connect the topological maps of each partial map created by the topological map creation unit with the connection point selected by the selection unit, and search for a shortest route on the connected topological map, a dividing unit to divide the shortest route searched by the search unit into a topological map for each of the plurality of partial maps, and a planning unit to plan a travel route which connects the connection points included in the topological map for each partial map divided by the dividing unit.

According to the autonomous mobile device of a preferred embodiment of the present invention, the connection relation of the branching points of the thinned movable area is represented as a topological map for each partial map, and the topological maps that were created for each partial map are connected. Consequently, the overall mobile area is represented as a single topological map. Here, since the topological map is a map which includes, as information, only the connection relation of the branching points and the distance between the connected branching points (specifically, it does not include coordinate information), even if they are connected, they will not be affected by the distortion caused by measurement errors. Subsequently, after the search for the shortest route is executed using the connected topological map, the topological map is once again divided for each partial map, and the travel route is planned according to the searched shortest route. Consequently, it is possible to plan the shortest travel route across a plurality of partial maps.

Preferably, the autonomous mobile device according to a preferred embodiment of the present invention also includes a moving unit to move the autonomous mobile device, a control unit to control the moving unit so that the autonomous mobile device autonomously travels along the travel route planned by the planning unit for each of the plurality of partial maps, and a switching unit to switch, upon changing from a partial map during travel to a different partial map, the partial map to be used for traveling to a partial map of a travel destination, based on the connection relation between connection points of the partial map set forth by the connecting unit.

According to the autonomous mobile device of a preferred embodiment of the present invention, upon autonomously traveling along a travel route across a plurality of partial maps, the partial map is switched based on the connection relation between the partial maps when changing from the partial map during travel to a different partial map. Accordingly, it is possible to autonomously travel to the destination (goal point) across a plurality of partial maps.

In the autonomous mobile device according to a preferred embodiment of the present invention, preferably, the switching unit switches, upon changing to the different partial map, a coordinate system to be used from a coordinate system of the partial map during travel to the coordinate system of the partial map of a travel destination.

In this case, upon changing to a different partial map, switching is performed from the coordinate system of the partial map during travel to the coordinate system of the partial map of the travel destination. Accordingly, it is possible to change from the partial map during travel to the partial map of the travel destination.

According to a preferred embodiment of the present invention, it is possible to create, with less burden, a highly reliable environmental map including a setting point on the environmental map and perform more accurate autonomous travel by using the environmental map.

Moreover, according to a preferred embodiment of the present invention, it is possible to resolve the inconsistency in the environmental map caused by the accumulation of measurement errors, and flexibly deal with partial changes to the layout of the mobile area.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a diagram showing the coordinate transformation matrix of the partial maps.

FIG. 14 is a diagram showing one example of an environmental map divided into partial maps.

DETAILED DESCRIPTION OF THE PREFERRED EMBODIMENTS

Figure 1:
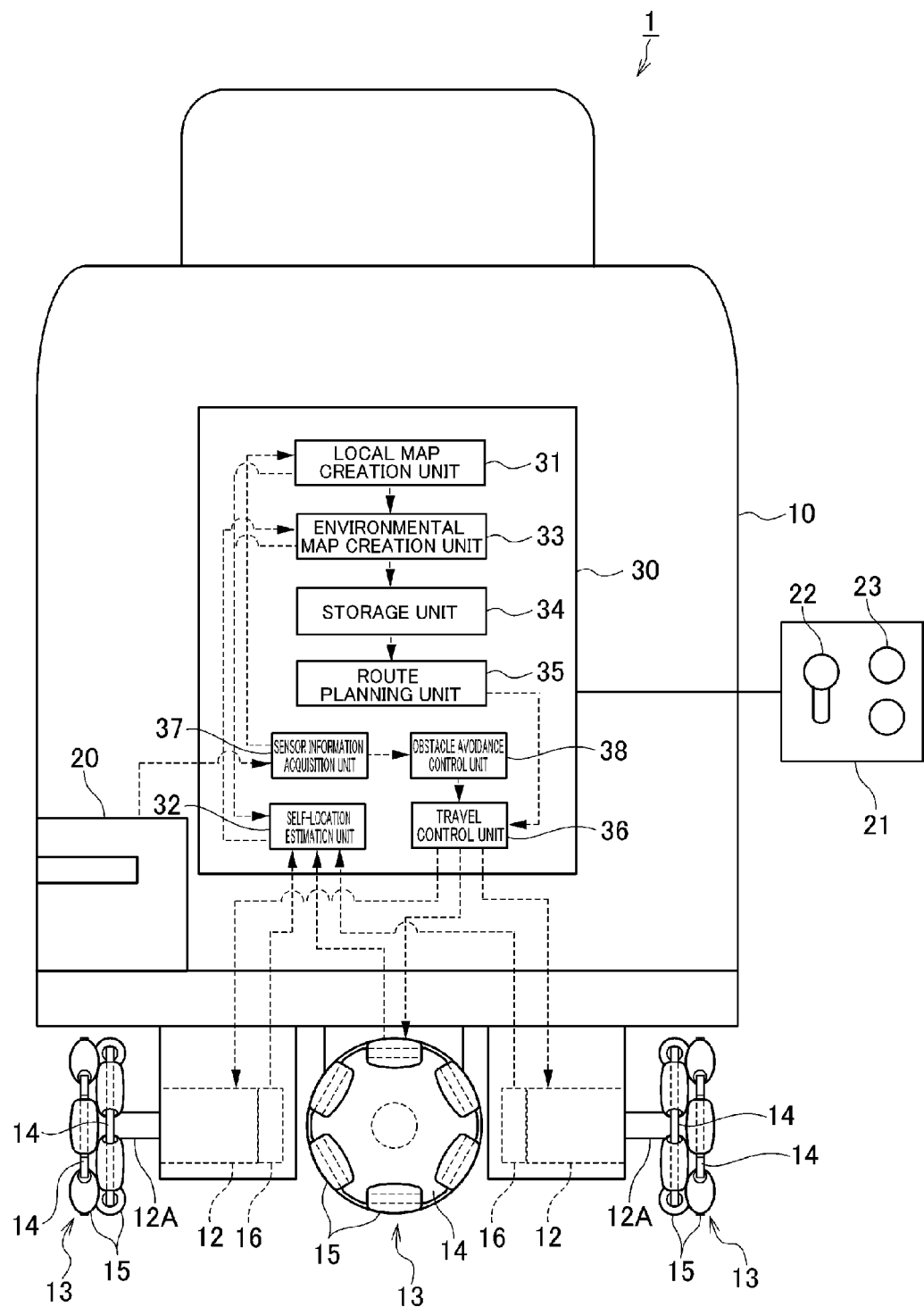
FIG. 1 is a block diagram showing the configuration of the autonomous mobile device according to a first preferred embodiment of the present invention.

The preferred embodiments of the present invention are now explained in detail with reference to the appended drawings. Note that, in the respective drawings, the same elements are given the same reference numeral and redundant explanations are omitted.

First Preferred Embodiment

The configuration of an autonomous mobile device 1 according to the first preferred embodiment is foremost explained with reference to FIG. 1. FIG. 1 is a block diagram showing the configuration of the autonomous mobile device 1.

The autonomous mobile device 1 has a function of creating an environmental map (grid map showing an area with obstacles and an area without obstacles) of the travel space (area) by using SLAM when the autonomous mobile device 1 is being guided according to the user's remote operation, and, upon being guided and reaching a predetermined setting point, registering the actual self-location at such time as the position coordinate of a setting point on the environmental map (the mode for executing this function is referred to as the "installation mode"). Moreover, the autonomous mobile device 1 has a function of planning the travel route using the setting point on the environmental map that was created and stored, and autonomously traveling from the starting point (including the present location of the autonomous mobile device 1) to the goal point along the planned travel route (the mode for executing this function is referred to as the "delivery mode"). Thus, the autonomous mobile device 1 preferably includes a main body 10 provided with an electric motor 12 at the lower portion thereof and an omni wheel 13 that is driven by the electric motor 12, a laser range finder 20 for measuring the distance to the objects (for example, walls and obstacles) existing in the vicinity thereof, and a joystick 21 for guiding the autonomous mobile device 1 and registering the setting point. Moreover, the autonomous mobile device 1 includes an electronic controller 30 which creates the environmental map in the installation mode and plans the travel route in the delivery mode, and governs the autonomous moving along the travel route in an integrated manner. Each of the constituent elements is described in detail below.

The main body 10 is a metal frame formed, for example, in an approximate cylindrical bottomed shape, and the main body 10 is mounted with the laser range finder 20 and the electronic controller 30 and so on. Note that the shape of the main body 10 is not limited to the approximate cylindrical bottomed shape. At the lower portion of the main body 10, preferably four electric motors 12 are disposed and mounted in a cross shape, for example. An omni wheel 13 is mounted to a drive shaft 12A of each of the four electric motors 12.

Specifically, the four omni wheels 13 are mounted by being spaced at 90° intervals along the circumferential direction in a concyclic manner.

The omni wheel 13 preferably includes two wheels 14 that rotate around the drive shaft 12A of the electric motor 12, and six free rollers 15, for example, provided rotatably around a shaft that is orthogonal to the drive shaft 12A of the electric motor 12 at the outer circumference of the respective wheels 14, and can move omni-directionally. Note that the two wheels 14 are mounted by shifting the phase by 30°. Based on this configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of the wheel 14. Thus, by independently controlling the four electric motors 12, and by independently adjusting the rotating direction and rotating speed of the respective four omni wheels 13, the autonomous mobile device 1 can move in an arbitrary direction (omni-directionally). Specifically, electric motors 12 and the omni wheel 13 function as the moving unit according to a preferred embodiment of the present invention.

The drive shaft 12A of each of the four electric motors 12 is mounted with an encoder 16 to detect the angle of rotation (or amount of drive or amount of rotation) of the drive shaft 12A. Each encoder 16 is connected to the electronic controller 30, and outputs the detected angle of rotation of the respective electric motors 12 to the electronic controller 30. The electronic controller 30 computes the travel distance of the autonomous mobile device 1 from the angle of rotation of the respective electric motors 12 that was input.

The laser range finder 20 is mounted on the front portion of the autonomous mobile device 1 so as to face the front (forward) direction of the autonomous mobile device 1. The laser range finder 20 scans the circumference of the autonomous mobile device 1 in a fan-like manner in the horizontal direction with a central angle of 240° by emitting a laser (detection wave) and reflecting the emitted laser with a rotating mirror. Subsequently, the laser range finder 20 detects the laser that was returned by reflecting off an object such as a wall or an obstacle, for example, and detects the angle formed by and the distance to the object by measuring the detection angle of the laser (reflected wave) and the time (propagation time) from the emission of the laser to the return thereof upon being reflected off an object. Specifically, laser range finder 20 functions as the object information acquisition unit according to a preferred embodiment of the present invention. Note that the laser range finder 20 is connected to the electronic controller 30, and outputs, to the electronic controller 30, the detected distance information and angle information relative to the object in the vicinity.

The joystick 21 is an input device to guide and move the autonomous mobile device 1 according to the user's remote operation, and includes a rod-shaped lever 22 to give directions to guide the autonomous mobile device 1, and a registration switch 23 to register a setting point on the environmental map. By operating the lever 22 of the joystick 21, a user can give travel direction instructions to the autonomous mobile device 1 and thereby guide the autonomous mobile device 1. Moreover, while guiding the autonomous mobile device 1, by pressing a registration switch 23 when it reaches a predetermined setting point (for instance, starting point candidate, target pass-through point candidate, goal point candidate), a user can register the self-location at such time as the position coordinate of a setting point. In addition, a user can teach to register attribute information (for instance, front of an elevator, front of a conference room, front of a fire escape or the like) of the setting point. Specifically, the lever 22 configuring the joystick 21 functions as the guiding unit and the registration switch 23 functions as the teaching unit according to a preferred embodiment of the present invention. Note that the joystick 21 is preferably connected to the electronic controller 30, and outputs a guide control (direction instruction) signal and a setting point registration signal to the electronic controller 30.

The electronic controller 30 governs the overall control of the autonomous mobile device 1. The electronic controller 30 preferably includes a microprocessor that performs operations, a ROM that stores programs and the like for causing the microprocessor to execute the respective processes, a RAM that temporarily stores various types of data such as operation results and the like, and a backup RAM that retains stored contents. Moreover, the electronic controller 30 includes an interface circuit to electrically connect the laser range finder 20, the joystick 21 and the microprocessor, a driver circuit to drive the electric motor 12, and so on.

The electronic controller 30 creates the environmental map of the travel space (area) by using SLAM as a result of executing the installation mode, and registers the position coordinate of the setting point on the environmental map. Moreover, by executing the delivery mode, the electronic controller 30 plans the travel route with the setting point as the goal candidate or the like, and controls the electric motor so that the autonomous mobile device 1 autonomously travels from the starting point (present location of the autonomous mobile device 1) to the goal point along the planned travel route. Thus, the electronic controller 30 includes a local map creation unit 31, a self-location estimation unit 32, an environmental map creation unit 33, a storage unit 34, a route planning unit 35, a travel control unit 36, a sensor information acquisition unit 37, and an obstacle avoidance control unit 38. Note that each of the foregoing components is configured by combining the foregoing hardware and software.

The local map creation unit 31 creates a local map of surroundings of the autonomous mobile device 1 with the laser range finder 20 as the original point (range that can be detected by the laser range finder 20) based on the distance information and angle information (corresponds to the object information described in the claims) relative to the object in the vicinity which were read from the laser range finder 20 via the sensor information acquisition unit 37. Specifically, the local map creation unit 31 functions as the local map creation unit according to a preferred embodiment of the present invention.

The self-location estimation unit 32 compares the local map that was subject to coordinated transformation to the coordinate system (absolute coordinate system) of the environmental map in consideration of the travel distance of the autonomous mobile device 1 calculated according to the angle of rotation of the respective electric motors 12 read from the respective encoders 16, with the environmental map, and estimates the self-location based on the results thereof. Specifically, the self-location estimation unit 32 functions as the self-location estimation unit according to a preferred embodiment of the present invention. Moreover, when a setting point registration signal is input from the joystick 21 (registration switch 23), the self-location estimation unit 32 registers, in the storage unit 34, the self-location at such time as the position coordinate of the setting point on the environmental map.

The environmental map creation unit 33 creates the environmental map of the travel space (area) by using SLAM during guided travel (during execution of the installation mode). Specifically, the environmental map creation unit 33 functions as the environmental map creation unit according to a preferred embodiment of the present invention. The environmental map is a grid map of the mobile area of the autonomous mobile device 1, and the position of fixed objects (objects) such as wall surfaces is recorded therein. Here, a grid map is a map that is configured from a plane in which a horizontal plane is divided into cells (hereinafter also referred to as the "unit grids" or simply "grids") of a predetermined size (for example, 1 cm×1 cm), and each unit grid is provided with object existence probability information showing whether an object exists. In this preferred embodiment, a value of "0 to 1" is given to a grid containing an object (obstacle) according to its existing probability, and a value of "0 to −1" is given to a grid with no object (obstacle) according to its existing probability. Moreover, "0" is given to a grid in which the existence of an object (obstacle) is unknown.

Here, to more specifically explain the method of creating an environmental map, the environmental map creation unit 33 foremost acquires a local map from the local map creation unit 31, and acquires the self-location on the environmental map from the self-location estimation unit 32. Next, the environmental map creation unit 33 projects, on the environmental map, the local map (the local map that was subject to coordinate transformation is hereinafter referred to as the "local map@absolute coordinate system") by coordinate transforming the local map from the coordinate system with the laser range finder 20 as the original point to the coordinate system (hereinafter also referred to as the "absolute coordinate system") of the environmental map based on the self-location on the environmental map. Subsequently, the environmental map creation unit 33 repeatedly executes this processing through while the autonomous mobile device 1 is being guided and moved, and creates the environmental map of the overall travel space (area) by sequentially appending (adding) the local map @ absolute coordinate system to the environmental map. Note that the environmental map creation unit 33 stops the creation and update of the environmental map during autonomous travel (during the execution of the delivery mode).

The storage unit 34 preferably includes, for example, from the backup RAM or the like, and stores the environmental map created by the environmental map creation unit 33. Moreover, the storage unit 34 has a storage area to store the position coordinate of the setting point and information regarding the travel route that is planned by the route planning unit 35 described later, and also stores such information. Specifically, the storage unit 34 functions as the storage unit according to a preferred embodiment of the present invention. Note that the storage unit 34 may also be an SRAM or EEPROM or the like.

The route planning unit 35 plans the travel route of the autonomous mobile device 1 by connecting the self-location of the autonomous mobile device 1 and the setting point selected by the user (setting point on the environmental map stored in the storage unit 34 (for example, starting point, target pass-through point, goal point)). Note that, when planning the travel route with the setting point as the goal point, it may not be necessary to connect the setting points to each other since the self location can be recognized. Specifically, the route planning unit 35 functions as the route planning unit according to a preferred embodiment of the present invention. More specifically, the route planning unit 35 foremost generates, for example, an extended obstacle area by extending the outline of the obstacle area included in the environmental map in an amount corresponding to the radius of the autonomous mobile device 1 by using the Minkowski sum, and extracts the area excluding the extended obstacle area as the movable area where the autonomous mobile device 1 can be move without coming in contact with an obstacle. Next, the route planning unit 35 uses the Hilditch thinning method and thins the extracted movable area. Subsequently, the route planning unit 35 plans the travel route by searching for the shortest route connecting the setting points (starting point, target pass-through point, goal point) within the thinned movable area with the A* algorithm (A star algorithm).

The travel control unit 36 drives the electric motors so that the autonomous mobile device 1 moves (is guided) according to the guide control (direction instruction) signal (that is, the user's operation) that is input from the joystick 21 (lever 22) during the execution of the installation mode. Meanwhile, the travel control unit 36 controls the electric motors 12 so that the autonomous mobile device 1 autonomously travels to the goal point along the planned travel route while avoiding obstacles during the execution of the delivery mode. Specifically, the travel control unit 36 functions as the control unit according to a preferred embodiment of the present invention. Here, in this preferred embodiment, a virtual potential method was adopted as the control method of causing the autonomous mobile device 1 to autonomously travel along the travel route to the goal point while avoiding obstacles during the execution of the delivery mode. The virtual potential method is a method of generating a virtual gravitation potential field relative to the goal position and a virtual repulsion potential field relative to the obstacle to be avoided, and superposing these fields so that the autonomous mobile device 1 heads to the goal position while avoiding contact with the obstacles. More specifically, the travel control unit 36 foremost calculates the virtual gravitation for heading toward the goal position based on the self-location. Meanwhile, a virtual repulsion for avoiding obstacles is calculated by the obstacle avoidance control unit 38 based on the self-location, travel speed, position and speed of obstacles. Subsequently, the travel control unit 36 calculates the virtual force vector by performing vector synthesis to the obtained virtual gravitation and virtual repulsion. The travel control unit 36 controls the travel of the autonomous mobile device 1 to move to the goal point while avoiding obstacles by driving the electric motor 12 (omni wheel 13) according to the obtained virtual force vector.

Figure 2:
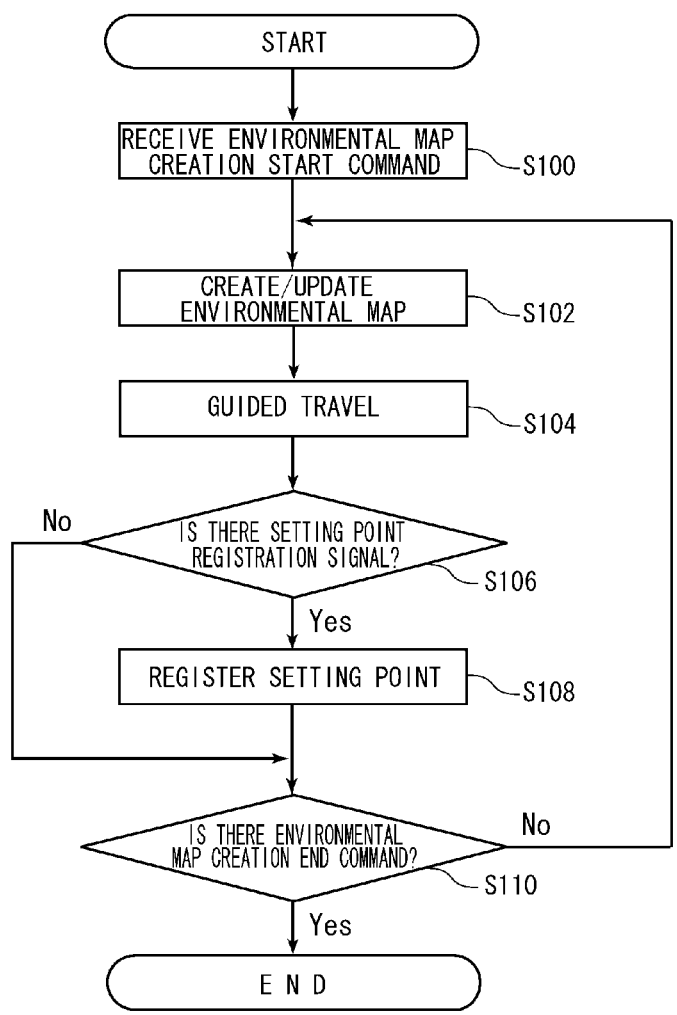
FIG. 2 is a flowchart showing the processing routine of the installation processing (installation mode) performed by the autonomous mobile device according to the first preferred embodiment of the present invention.
Figure 3:
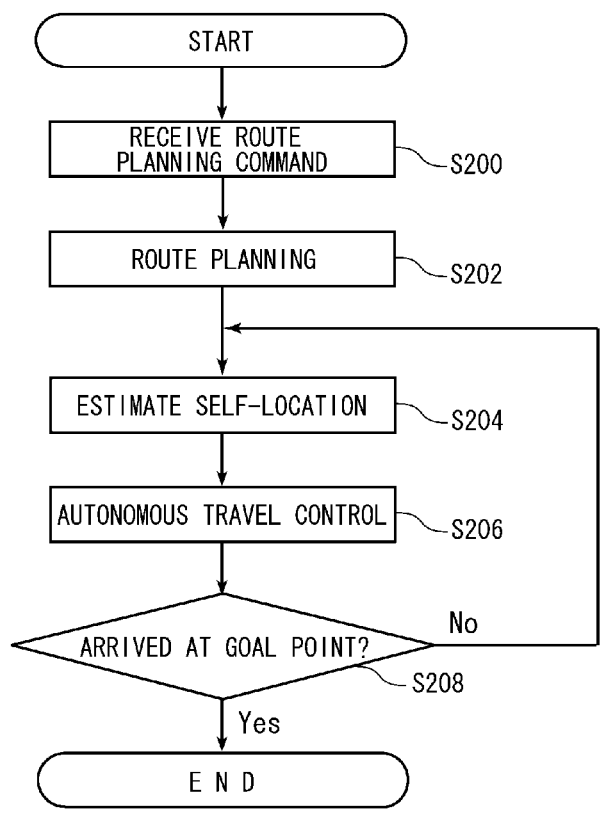
FIG. 3 is a flowchart showing the processing routine of the delivery processing (delivery mode) performed by the autonomous mobile device according to the first preferred embodiment of the present invention.

The operation of the autonomous mobile device 1 is now explained with reference to FIG. 2 and FIG. 3. FIG. 2 is a flowchart showing the processing routine of the installation processing (installation mode) performed by the autonomous mobile device 1. Moreover, FIG. 3 is a flowchart showing the processing routine of the delivery processing (delivery mode) performed by the autonomous mobile device 1. The respective processes shown in FIG. 2 and FIG. 3 are mainly performed by the electronic controller 30, and are started and executed based on the user's operation. Note that the installation processing (installation mode) shown in FIG. 2 is executed before the delivery processing (delivery mode) shown in FIG. 3.

The processing routine of the installation processing (installation mode) is foremost explained with reference to FIG. 2. Note that, prior to starting the installation processing, it is desirable to eliminate any movable objects placed on the guiding route as advance preparation. Moreover, when the environmental map is being created while guiding the autonomous mobile device 1, it is desirable to prevent any mobile object from entering the detection range of the laser range finder 20.

In step S100, when the environmental map creation start command from the user is acceptably received, the autonomous mobile device 1 is guided and starts to move. In subsequent step S102, SLAM is used to create (or update) the environmental map of the mobile area. Note that the method of creating the environmental map is as described above, and the detailed explanation thereof is omitted.

Subsequently, in step S104, the autonomous mobile device 1 is guided and moves according to the guide control (direction instruction) signal (that is, the user's operation) input from the joystick 21 (lever 22).

Next, in step S106, whether the setting point registration signal was input from the joystick 21 (registration switch 23), is determined. Here, if the setting point registration signal was input, in step S108, the self-location at such position is registered as the position coordinate of the setting point on the environmental map. Meanwhile, if the setting point registration signal was not input, the processing proceeds to step S110.

In step S110, whether the environmental map creation end command was acceptably received from the user, is determined. Here, if the environmental map creation end command was not acceptably received, the processing proceeds to step S102, and the processing of foregoing step S102 to step S108 is repeatedly executed until the environmental map creation end command is received. Meanwhile, if the environmental map creation end command was acceptably received, the created environmental map including the setting point is stored, and the installation processing (installation mode) is ended.

The processing routine of the delivery processing (delivery mode) performed by the autonomous mobile device 1 is now explained. Foremost, in step S200, the route planning command is acceptably received from the user, then in step S202, the travel route of the autonomous mobile device 1 is planned. Specifically, the travel route of the autonomous mobile device 1 is planned as a result of the user designating at least one setting point (starting point, target pass-through point, goal point) on the environmental map stored in the storage unit 34. Note that the method of route planning is as described above, and the detailed explanation thereof is omitted.

Next, in step S204, the self-location is estimated. Specifically, a local map is acquired by the local map creation unit 31 based on the detection results of the laser range finder 20, and a plurality of tentative self-locations are hypothesized in consideration of the travel distance of the autonomous mobile device 1 calculated according to the angle of rotation of the respective electric motors 12 read from the encoder 16. The acquired local map is converted into a local map @ absolute coordinate system in the respective tentative self-locations, and a plurality of local map @ absolute coordinate systems is thereby acquired. Each of the plurality of local map @ absolute coordinate systems is compared with the environmental map, the likelihood in the respective tentative self-locations is computed, Bayesian filtering is applied to the likelihood in the respective tentative self-locations (prior probability and likelihood are multiplied), and the posterior probability in the respective tentative self-locations is thereby calculated. The highest posterior probability among the plurality of calculated posterior probabilities is extracted, and the tentative self-location corresponding thereto is estimated as the true self-location. Upon extracting the highest posterior probability, it is possible to extract the posterior probability with the highest peak in the distribution of the plurality of posterior probabilities, or extract the posterior probability with the highest expected value.

Subsequently, in step S206, autonomous travel control is executed, and the electric motor 12 is controlled so as to cause the autonomous mobile device 1 to travel autonomously to the goal point along the planned travel route while avoiding obstacles. As described above, in this preferred embodiment, the virtual potential method was adopted as the control method of causing the autonomous mobile device 1 to travel autonomously to the goal point along the planned travel route while avoiding obstacles. Note that the virtual potential method is as described above, and the detailed explanation thereof is omitted.

In subsequent step S208, whether the autonomous mobile device 1 reached the goal point, is determined. Here, if the autonomous mobile device 1 has not reached the goal point, the processing proceeds to step S204, and the processing of foregoing step S204 (self-location estimation) and step S206 (autonomous travel control) is repeatedly executed until the autonomous mobile device 1 reaches the goal point. Meanwhile, if the autonomous mobile device 1 has reached the goal point, the delivery processing (delivery mode) is ended.

According to this preferred embodiment, an environmental map is created while the autonomous mobile device 1 is being guided according to the user's operation, and, when the autonomous mobile device 1 is guided and reaches a predetermined setting point, the actual self-location at such time is registered as the position coordinate of the setting point on the environmental map. Thus, it is possible to create an environmental map including a setting point that is not displaced relative to the actual mobile environment just by registering the setting point while guiding the autonomous mobile device within the mobile area.

Moreover, according to this preferred embodiment, the travel route is planned by designating the setting point on the environmental map that was created and stored, and the autonomous mobile device is controlled so as to autonomously travel along that travel route. Thus, for example, if the travel route is planned with the setting point as the start point and/or goal point, it is possible to plan a travel route with minimal deviation from the actual mobile area, and travel autonomously with favorable reproducibility. Consequently, according to this preferred embodiment, it is possible to easily create a highly reliable environmental map including a setting point on the environmental map, and perform more accurate autonomous travel by using the environmental map.

Second Preferred Embodiment

Figure 4:
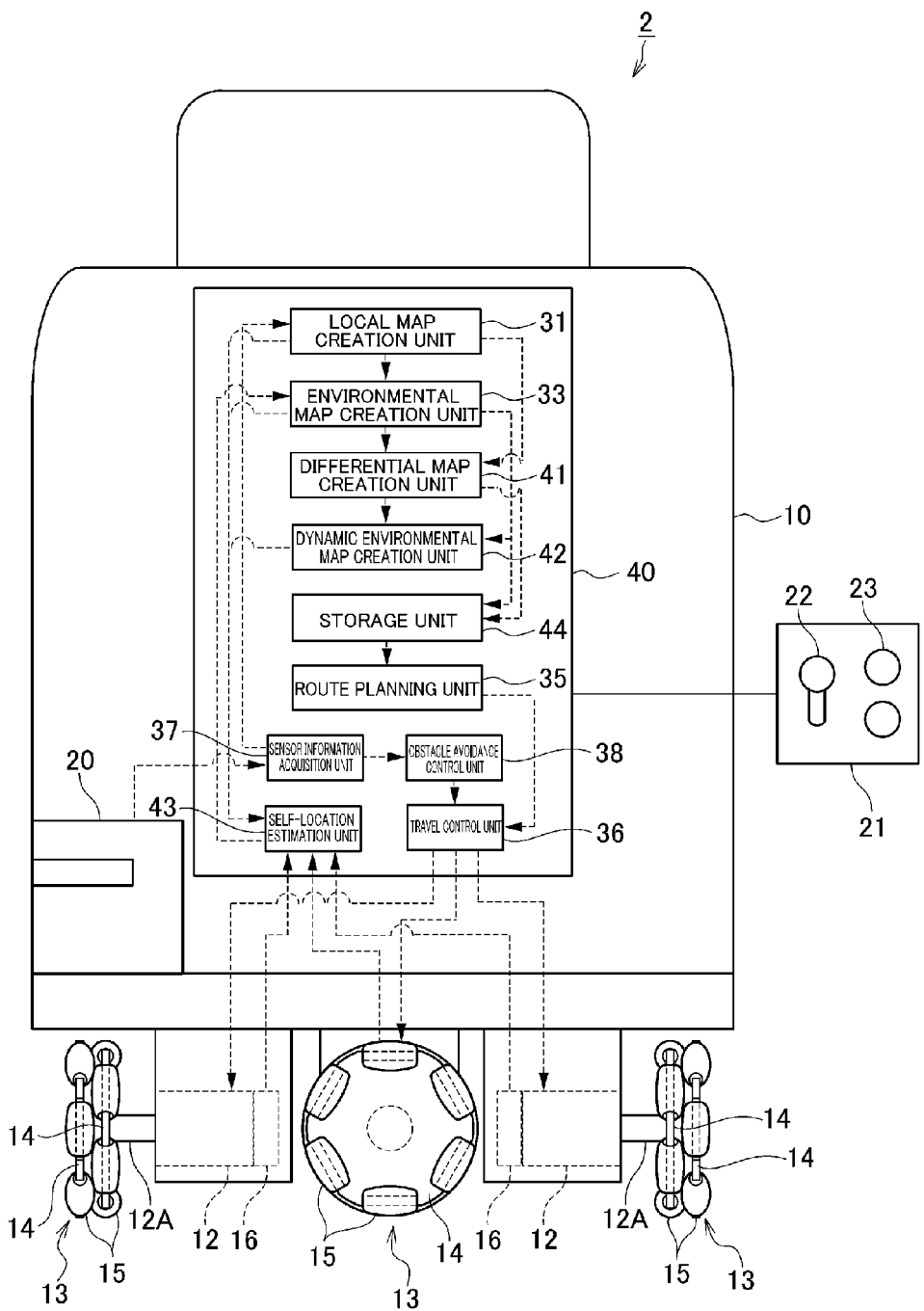
FIG. 4 is a block diagram showing the configuration of the autonomous mobile device according to a second preferred embodiment of the present invention.

The configuration of the autonomous mobile device 2 according to the second preferred embodiment is now explained with reference to FIG. 4. FIG. 4 is a block diagram showing the configuration of the autonomous mobile device 2. Note that, in FIG. 4, elements which are the same as or equivalent to those of the first preferred embodiment are given the same reference numeral.

The autonomous mobile device 2 differs from the autonomous mobile device 1 in that it includes an electronic controller 40 as substitute for the electronic controller 30 described above. The electronic controller 40 differs from the electronic controller 30 in that it additionally includes a differential map creation unit 41 and a dynamic environmental map creation unit 42, and includes a self-location estimation unit 43 and a storage unit 44 as substitute for the self-location estimation unit 32 and the storage unit 34. These components which are different from the autonomous mobile device 1 are now explained in detail. Note that the remaining configuration is the same as or equivalent to the autonomous mobile device 1, and the explanation thereof is omitted.

The dynamic environmental map creation unit 42 creates a dynamic environmental map representing the current actual environment by adding, for each grid, a differential map created by the differential map creation unit 41 described later and an environmental map (hereinafter also referred to as the "static environmental map") stored in the storage unit 44 when the autonomous mobile device 2 autonomously travels along the travel route. Specifically, the dynamic environmental map creation unit functions as the dynamic environmental map creation unit according to a preferred embodiment of the present invention. Note that the dynamic environmental map can also be created by adding, for each grid, the product of multiplying a coefficient P1 (for example, 0.5) to the respective grids of the static environmental map, and the product of multiplying a coefficient P2 (for example, 1.0) to the respective grids of the differential map.

When the autonomous mobile device 2 autonomously travels along the travel route, the differential map creation unit 41 creates/updates the differential map representing the difference between the dynamic environmental map and the static environmental map; that is, the object change level within the mobile area. More specifically, the differential map creation unit 41 creates (updates) the differential map (t: current value) by obtaining, for each grid, the difference between the result obtained by adding, for each grid, the dynamic environmental map (t−1: previous value) and the local map @ absolute coordinate system (t: current value), and the static environmental map. Specifically, the differential map creation unit 41 functions as the differential map creation unit according to a preferred embodiment of the present invention. Note that the coordinate system of the differential map is the same as the static environmental map (absolute coordinate). Moreover, the differential map stored in the storage unit 44 described later is only of the portion around the autonomous mobile device 2, and the differential map of the area where the autonomous mobile device 2 has passed through as a result of traveling, is deleted from the storage unit 44. Note that it is also possible to create (update) the differential map by obtaining, for each grid, the difference between the result of adding, for each grid, the dynamic environmental map and the local map @ absolute coordinate system, and the product of multiplying a coefficient P1 (for example, 0.5) to the respective grids of the static environmental map. In this case, the upper limit value of the dynamic environmental map is limited to "0.5" and the lower limit value thereof limited to "−0.5" in consideration of the coefficient P1.

The storage unit 44 includes a storage area for storing the differential map in addition to the static environmental map, and stores the static environmental map and the differential map. Note that the dynamic environmental map is temporarily created and stored only while the estimation of the self-location (described later) is being performed, and is not permanently stored in the storage unit 44.

When the autonomous mobile device 2 autonomously travels along the travel route, the self-location estimation unit 43 compares (performs matching for each grid) each of the static environmental map and the dynamic environmental map with the local map @ absolute coordinate system in consideration of the travel distance of the autonomous mobile device 2 calculated according to the angle of rotation of the respective electric motors 12 read from the encoder 16, and estimates the self-location based on the comparison result (upon executing the same processing as step S204 described above). To explain this more specifically, the self-location estimation unit 43 foremost projects, on the static environmental map and the dynamic environmental map, a grid in which the value (object existing probability) of the grid included in the local map @ absolute coordinate system is 1.0, and compares the value of the grid of the local map @ absolute coordinate system with the value of the respective grids of the static environmental map and the dynamic environmental map corresponding to the grid. Subsequently, the grid value of a map with a higher matching level for each grid is adopted, and the average of the adopted grid values is used as the score (likelihood) of that position (tentative self-location). For example, if the grid value of the local map @ absolute coordinate system is 1.0, the grid value of the static environmental map is 1.0, and the grid value of the dynamic environmental map is 0.5, the grid value 1.0 of the static environmental map is adopted. Moreover, for example, if the grid value of the local map @ absolute coordinate system is 1.0, the grid value of the static environmental map is −1.0, and the grid value of the dynamic environmental map is 0.3, the grid value 0.3 of the dynamic environmental map is adopted. Subsequently, for example, if the adopted grid values of the four grids are 1.0, 1.0, 0.3, and 0.3, the average value 0.65 thereof becomes the score of the tentative self-location. Similarly, the scores are obtained with the tentative self-locations as A point, B point, C point, D point, . . . , and the location with the highest score is estimated as the self-location. Here, upon obtaining the score (likelihood) of the self-location, rather than only targeting the grids in which the grid value (object existing probability) is 1.0, for example, the score may also be obtained by targeting grids in which the grid value (object existing probability) is −1.0, or the score may be obtained by targeting all grids.

Figure 5:
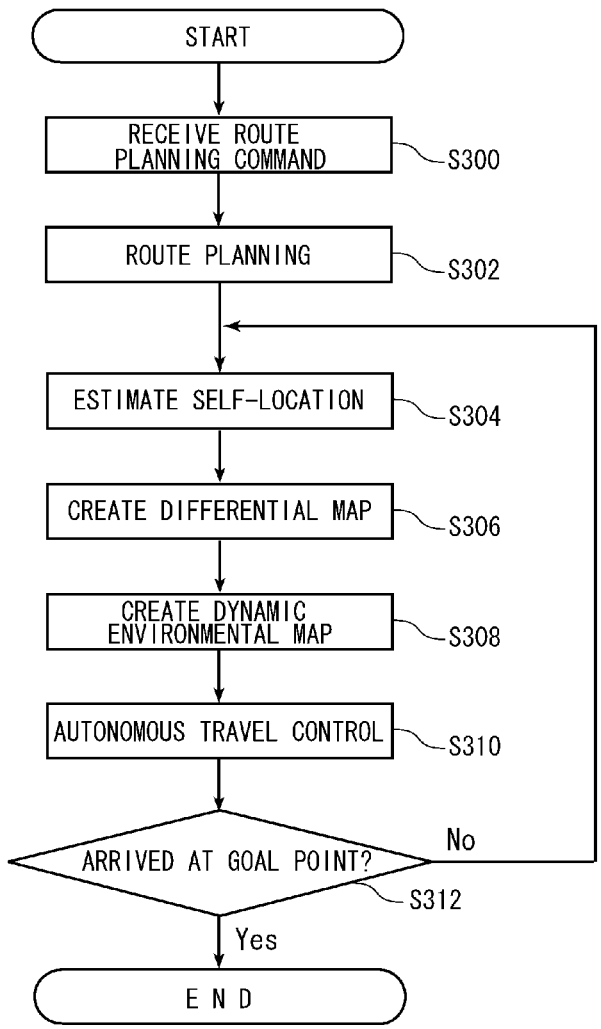
FIG. 5 is a flowchart showing the processing routine of the delivery processing (delivery mode) performed by the autonomous mobile device according to the second preferred embodiment of the present invention.

The operation of the autonomous mobile device 2 is now explained with reference to FIG. 5. FIG. 5 is a flowchart showing the processing routine of the delivery processing (delivery mode) performed by the autonomous mobile device 2. The delivery processing shown in FIG. 5 is mainly performed by the electronic controller 40, and is started and executed based on the user's operation. Note that the processing routine of the installation processing (installation mode) performed by the autonomous mobile device 2 is the same as the case of the autonomous mobile device 1 described above, and the explanation thereof is omitted.

In step S300, when the route planning command is acceptably received from the user, in step S302, the travel route of the autonomous mobile device 2 is planned. Specifically, the travel route of the autonomous mobile device 2 is planned as a result of designating at least one setting point (starting point, target pass-through point, goal point) on the environmental map stored in the storage unit 44. Note that the method of route planning is as described above, and the detailed explanation thereof is omitted.

Next, in step S304, the self-location is estimated. Specifically, each of the static environmental map and the dynamic environmental map is compared (matched) with the local map @ absolute coordinate system in consideration of the travel distance of the autonomous mobile device 2 calculated according to the angle of rotation of the respective electric motors 12, which is read from the encoder 16, and the self-location is estimated based on the comparison result (upon executing the same processing as step S204 described above). Note that the method of estimating the self-location is as described above, and the detailed explanation thereof is omitted.

Next, in step S306, the differential map (t: current value) is created (updated) based on the difference between the addition result of the dynamic environmental map (t−1: previous value) and the local map @ absolute coordinate system (t: current value), and the static environmental map. In subsequent step S308, the dynamic environmental map (t: current value) is created by the static environmental map and the differential map (t: current value) being added for each grid.

Subsequently, in step S310, autonomous travel control is executed, and the electric motor 12 is controlled so as to cause the autonomous mobile device 2 to travel autonomously to the goal point along the planned travel route while avoiding obstacles. As described above, in this preferred embodiment, the virtual potential method was preferably adopted as the control method of causing the autonomous mobile device 2 to travel autonomously to the goal point along the planned travel route while avoiding obstacles. Note that the virtual potential method is as described above, and the detailed explanation thereof is omitted.

In subsequent step S312, whether the autonomous mobile device 2 reached the goal point, is determined. Here, if the autonomous mobile device 2 has not reached the goal point, the processing proceeds to step S304, and the processing of foregoing step S304 to step S310 is repeatedly executed until the autonomous mobile device 2 reaches the goal point. Meanwhile, if the autonomous mobile device 2 has reached the goal point, the delivery processing (delivery mode) is ended.

According to this preferred embodiment, the differential map showing an object change level within the mobile area is created upon autonomously traveling along the travel route, and the dynamic environmental map is created based on the addition result of the environmental map and the differential map. Moreover, each of the environmental map and the dynamic environmental map is compared with the local map @ absolute coordinate system, and the self-location is estimated based on the comparison result (upon executing the same processing as step S204 described above). Since only the differential map is updated during the autonomous travel and a highly reliable environmental map is retained without being overwritten, for instance, if the estimated self-location is displaced from the actual self-location, it is possible to prevent a highly reliable environmental map from being erroneously overwritten. Moreover, for example, even if the estimated self-location is temporarily displaced from the actual self-location, it can be recovered. Moreover, if there is any changed to the environment within the mobile area, such as a mobile object passing through the vicinity of the autonomous mobile device 2 or a new object being placed on the hallway, such change is extracted as a differential map and reflected in the dynamic environmental map. Thus, it is possible to deal with dynamic environmental changes of the mobile environment.

Preferred embodiments of the present invention were explained above, but the present invention is not limited to the foregoing preferred embodiments, and can be modified variously. For example, although a joystick 21 was preferably used as the input device for remotely operating the autonomous mobile device 1, 2 in the foregoing preferred embodiments, a keyboard, a ten-key pad or other forms of remote controllers may be used so as long as it is able to guide the autonomous mobile device 1, 2 and register a setting point.

Although the distance to the obstacle was preferably measured using a laser range finder 20 in the foregoing preferred embodiments, configuration using a stereo camera, ultrasonic sensor or the like in substitute for or in addition to the laser range finder may also be adopted.

Although an omni wheel 13 capable of moving omni-directionally was preferably used in the foregoing preferred embodiments, a configuration using a standard wheel (steering wheel and drive wheel) may also be adopted.

Third Preferred Embodiment

Figure 6:
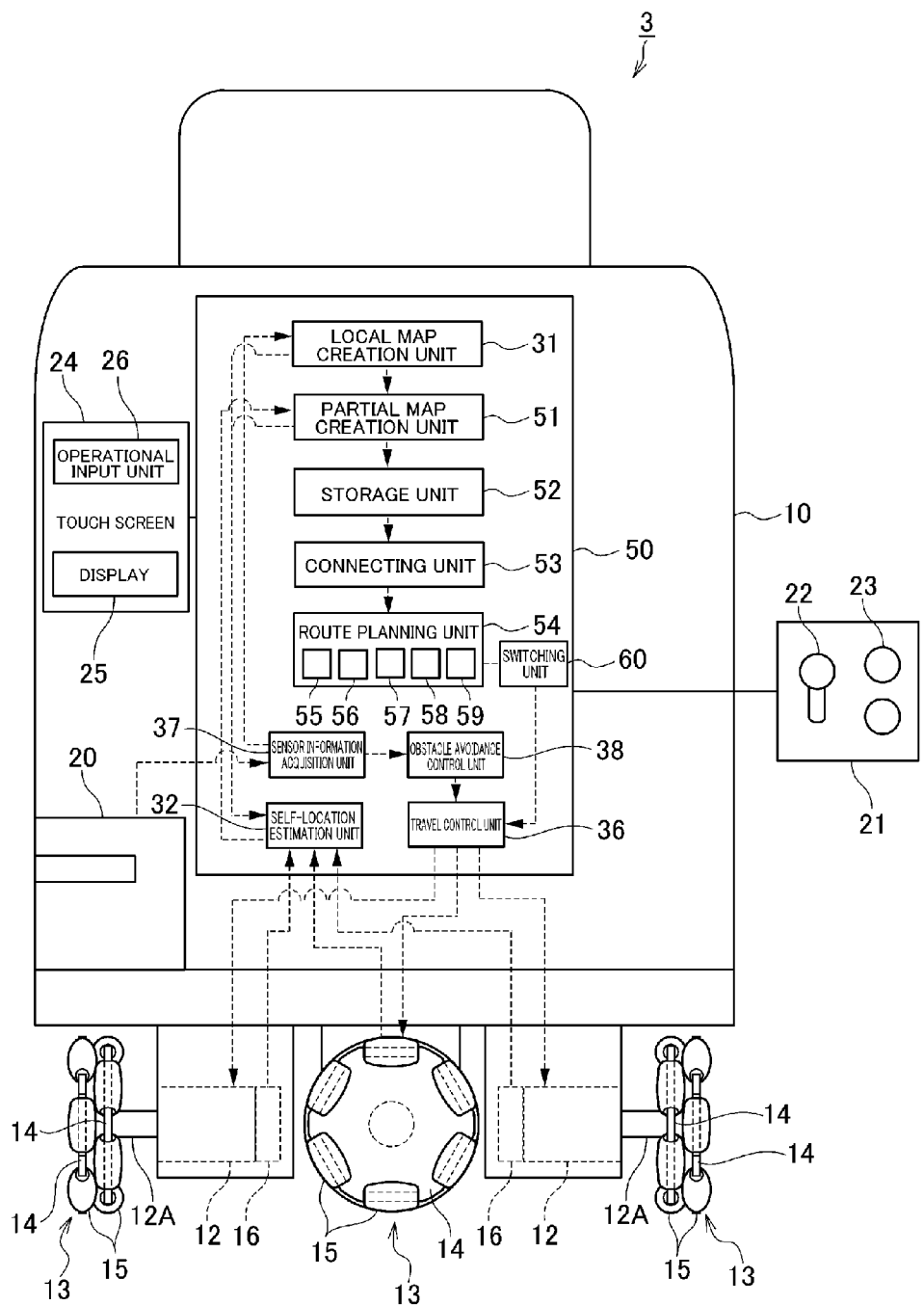
FIG. 6 is a block diagram showing the configuration of the autonomous mobile device according to a third preferred embodiment of the present invention.

The configuration of the autonomous mobile device 3 according to the third preferred embodiment is now explained with reference to FIG. 6. FIG. 6 is a block diagram showing the configuration of the autonomous mobile device 3.

The autonomous mobile device 3 has an environmental map creation function of creating an environmental map including a plurality of partial maps, a route planning function of planning a travel route across a plurality of partial maps, and an autonomous travel function of moving along the travel route across a plurality of partial maps. More specifically, the autonomous mobile device 3 has a function of creating a plurality of partial maps configuring the environmental map (grid map showing an area with obstacles and an area without obstacles) of the mobile area by using SLAM when the autonomous mobile device 3 is being guided according to the user's remote operation, and, upon being guided and reaching a connecting point between the partial maps (hereinafter also referred to as the "connection point", and this is designated by the user), registering the self-location at such time as the position coordinate of a connection point on the environmental map (the mode of executing this function is referred to as the "installation mode"). Moreover, the autonomous mobile device 3 has a function of extracting a movable area for each of the plurality of created partial maps, connecting the partial maps using a topological map, dividing the partial maps once again after searching for the shortest route on the topological map, and thereby planning the travel route for each partial map. In addition, the autonomous mobile device 3 has a function of autonomously traveling from the starting point to the goal point along the planned travel route (the mode of executing this function is referred to as the "delivery mode").

Thus, the autonomous mobile device 3 includes a main body 10 provided with an electric motor 12 at the lower portion thereof and an omni wheel 13 that is driven by the electric motor 12, a laser range finder 20 to measure the distance to the objects (for example, walls and obstacles) existing in the vicinity, and a joystick 21 to guide the autonomous mobile device 3 and registering the connection point. Moreover, the autonomous mobile device 3 includes an electronic controller 50 which creates a plurality of partial maps (environmental map), plans a travel route across the plurality of partial maps, and governs the autonomous control along the travel route in an integrated manner. Each of the constituent elements is described in detail below.

The main body 10 is a metal frame formed, for example, in an approximate cylindrical bottomed shape, and the main body 10 is mounted with the laser range finder 20 and the electronic controller 50 and so on. Note that the shape of the main body 10 is not limited to the approximate cylindrical bottomed shape. At the lower portion of the main body 10, preferably four electric motors 12 are disposed and mounted in a cross shape, for example. An omni wheel 13 is mounted to a drive shaft 12A of each of the four electric motors 12. Specifically, the four omni wheels 13 are mounted by being spaced at 90° intervals along the circumferential direction in a concyclic manner.

The omni wheel 13 is a wheel including two wheels 14 that rotate around the drive shaft 12A of the electric motor 12, and six free rollers 15 provided rotatably around a shaft that is orthogonal to the drive shaft 12A of the electric motor 12 at the outer circumference of the respective wheels 14, and is able to move omni-directionally. Note that the two wheels 14 are mounted by shifting the phase by 30°. Based on this kind of configuration, when the electric motor 12 is driven and the wheel 14 is rotated, the six free rollers 15 rotate integrally with the wheels 14. Meanwhile, as a result of the grounded free rollers 15 rotating, the omni wheel 13 can also move in a direction that is parallel with the rotating shaft of the wheel 14. Thus, by independently controlling the four electric motors 12, and by independently adjusting the rotating direction and rotating speed of the respective four omni wheels 13, the autonomous mobile device 3 can move in an arbitrary direction (omni-directionally). Specifically, the electric motor 12 and the omni wheel 13 function as the moving unit according to a preferred embodiment of the present invention.

The drive shaft 12A of each of the four electric motors 12 is mounted with an encoder 16 to detect the angle of rotation (specifically amount of driving or rotation) of the drive shaft 12A. Each encoder 16 is connected to the electronic controller 50, and outputs the detected angle of rotation of the respective electric motors 12 to the electronic controller 50. The electronic controller 50 computes the travel distance of the autonomous mobile device 3 from the angle of rotation of the respective electric motors 12 that was input.

The laser range finder 20 is mounted on the front portion of the autonomous mobile device 3 so as to face the front (forward) direction of the autonomous mobile device 3. The laser range finder 20 scans the circumference of the autonomous mobile device 1 in a fan-like manner in the horizontal direction with a central angle of 240° by emitting a laser (detection wave) and reflecting the emitted laser with a rotating mirror. Subsequently, the laser range finder 20 detects the laser that was returned by reflecting off an object such as a wall or an obstacle, and detects the angle formed with and the distance to the object by measuring the detection angle of the laser (reflected wave) and the time (propagation time) from the emission of the laser to the return thereof upon being reflected off an object. Specifically, the laser range finder 20 functions as an acquisition unit according to a preferred embodiment of the present invention. Note that the laser range finder 20 is connected to the electronic controller 50, and outputs, to the electronic controller 50, the detected distance information and angle information relative to the object in the vicinity.

The joystick 21 is an input device to guide and move the autonomous mobile device 3 according to the user's remote operation, and includes a rod-shaped lever 22 to give directions to guide the autonomous mobile device 3, and a registration switch 23 to register a connection point on the partial map. By operating the lever 22 of the joystick 21, a user can give travel direction instructions to the autonomous mobile device 3 and thereby guide the autonomous mobile device 3. Moreover, while guiding the autonomous mobile device 3 by pressing a registration switch 23 when it reaches a connection point of the partial map, a user can register the self-location at such time as the position coordinate of a connection point. Specifically, the registration switch 23 configuring the joystick 21 functions as the setting unit according to a preferred embodiment of the present invention. Note that the joystick 21 is connected to the electronic controller 50, and outputs a guide control (direction instruction) signal and a connection point registration signal to the electronic controller 50.

Figure 7:
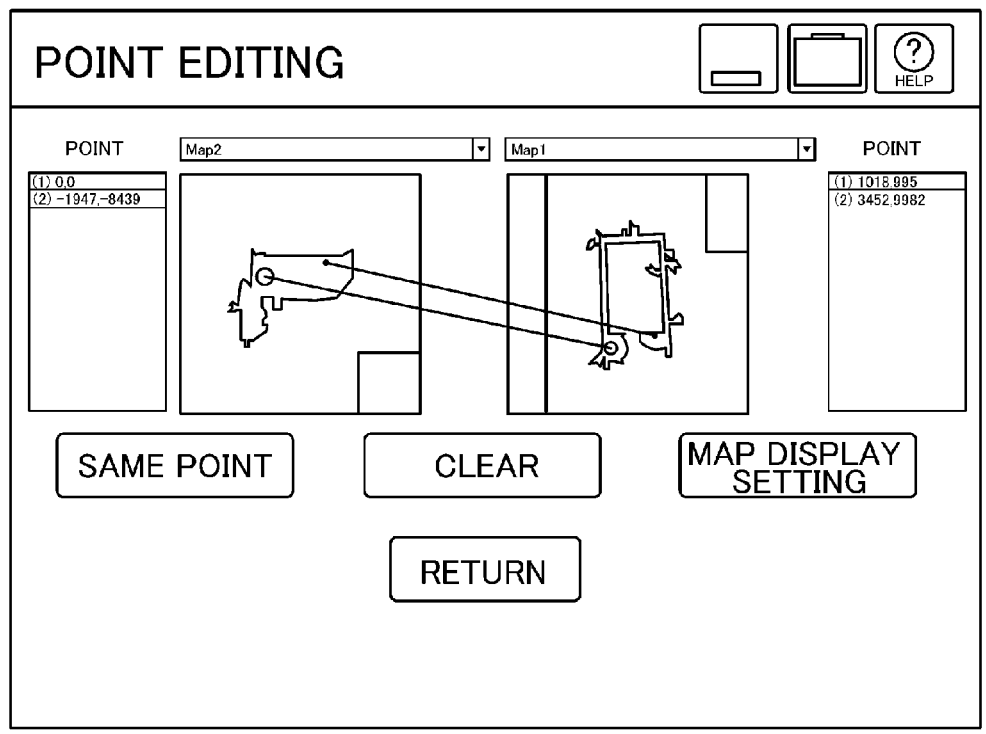
FIG. 7 is a diagram showing one example of the selection screen of the connection points.

The touch screen 24 is an input device that is configured by including a display unit 25 made of a liquid crystal display (LCD) or the like, and an operation input unit 26 made of a touch panel or the like to detect the touch operation (input) of the user on the display unit 25. The display unit 25 displays, for example, the partial map having a connection point and the coordinate information on a connection point upon registering a connection point and upon selecting a connection point. Moreover, the display unit 25 displays various switches and the like to acceptably receive operations from the user to select a connection point, starting point/goal point, and so on. Here, an example of the selection screen of the connection points displayed on the display unit 25 is shown in FIG. 7. With the screen shown in FIG. 7, the coordinate information on the selected connection points, the connection relation of the connection points, and other information are displayed.

The operation input unit 26 is arranged so as to cover the display screen of the display unit 25, a two-dimensional coordinate (X-Y coordinate) is virtually disposed on the surface thereof. The operation input unit 26 is used to acceptably receive the selection operation from the user, and, when the touch operation is performed by the user, it outputs the coordinate information according to the touched position. Note that, for the detection of the touched position, for example, pressure, electrostatic capacity, infrared, ultrasonic and the like are used. The operation input unit 26 determines the operations of the user based on display positions of various switches and the coordinate information showing the position that was touched by the user. Subsequently, the operation input unit 26 outputs the determined operations to the electronic controller 50. Here, the user can operate the operation input unit 26 to select the connection point to connect the partial maps or set the starting point/goal point and the like upon planning the route. Specifically, the operation input unit 26 functions as the selection unit according to a preferred embodiment of the present invention.

The electronic controller 50 governs the overall control of the autonomous mobile device 3. The electronic controller 50 preferably includes a microprocessor that performs operations, a ROM that stores programs and the like to cause the microprocessor to execute the respective processes described later, a RAM that temporarily stores various types of data such as operation results and the like, and a backup RAM that retains stored contents. Moreover, the electronic controller 50 includes an interface circuit to electrically connect the laser range finder 20, the joystick 21, the touch screen 24, and the microprocessor, a driver circuit to drive the electric motor 12, and so on.

The electronic controller 50 creates the environmental map of the mobile area, which preferably includes a plurality of partial maps by using SLAM as a result of executing the installation mode, and registers the position coordinate of the connection point on the partial map. Moreover, the electronic controller 50 plans a travel route across a plurality of partial maps. In addition, the electronic controller 50 controls the electric motor 12 so that the autonomous mobile device 3 autonomously travels across a plurality of partial maps from the starting point to the goal point along the planned travel route by executing the delivery mode. Thus, the electronic controller includes a local map creation unit 31, a self-location estimation unit 32, a travel control unit 36, a sensor information acquisition unit 37, an obstacle avoidance control unit 38, a partial map creation unit 51, a storage unit 52, a connecting unit 53, a route planning unit 54, and a switching unit 60. Note that each of the foregoing components is configured by combining the foregoing hardware and software.

The local map creation unit 31 creates a local map of surroundings of the autonomous mobile device 3 with the laser range finder 20 as the original point (range that can be detected by the laser range finder 20) based on the distance information and angle information (corresponds to the position information described in the claims) relative to the object in the vicinity, which were read from the laser range finder 20.

The self-location estimation unit 32 compares the local map and the partial map in consideration of the travel distance of the autonomous mobile device 3 calculated according to the angle of rotation of the respective electric motors 12, which is read from the respective encoders 16, and estimates the self-location based on the results thereof. Moreover, when a connection point registration signal is input from the joystick 21 (registration switch 23), the self-location estimation unit 32 registers, in the storage unit 52, the self-location at such time as the position coordinate of the connection point on the environmental map.

The partial map creation unit 51 creates a plurality of partial maps configuring the environmental map of the mobile area by using SLAM during guided travel (during execution of the installation mode). Specifically, the partial map creation unit functions as the creation unit according to a preferred embodiment of the present invention. More specifically, the partial map creation unit 51 foremost acquires a local map from the local map creation unit 31, and acquires the self-location from the self-location estimation unit 32. Next, the partial map creation unit 51 projects the local map on the partial map by coordinate-transforming the local map with the laser range finder as the original point from the coordinate system with the laser range finder 20 as the original point to the coordinate system of the partial map in correspondence with the self-location. Subsequently, the partial map creation unit 51 repeatedly executes this processing while the autonomous mobile device 3 is being guided and moved, and creates the partial map by sequentially appending (adding) the local map to the partial map. Moreover, the partial map creation unit 51 creates a plurality of partial maps to cover the entire area of the mobile area by sequentially creating, in a similar manner, a plurality of partial maps corresponding to each of the plurality of areas that form the mobile area. Note that, in cases where only a portion of the layout of the mobile area is changed, it is also possible to create only the partial map of that area where the layout was changed.

Figure 8:
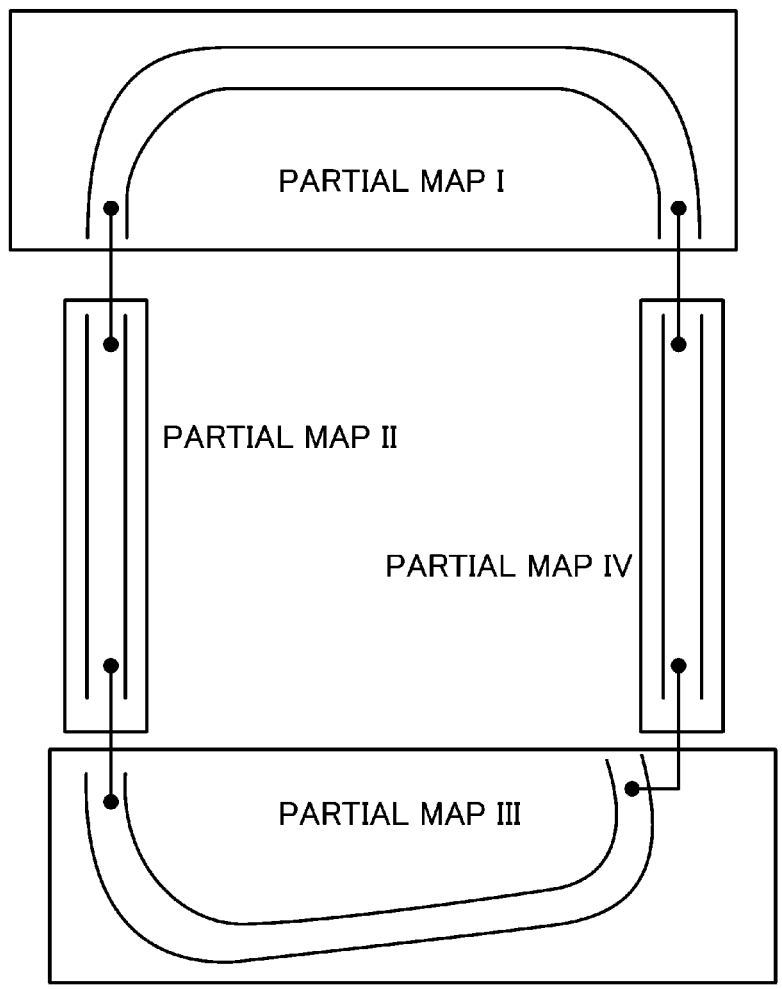
FIG. 8 is a diagram showing one example of partial maps.
Figure 9:
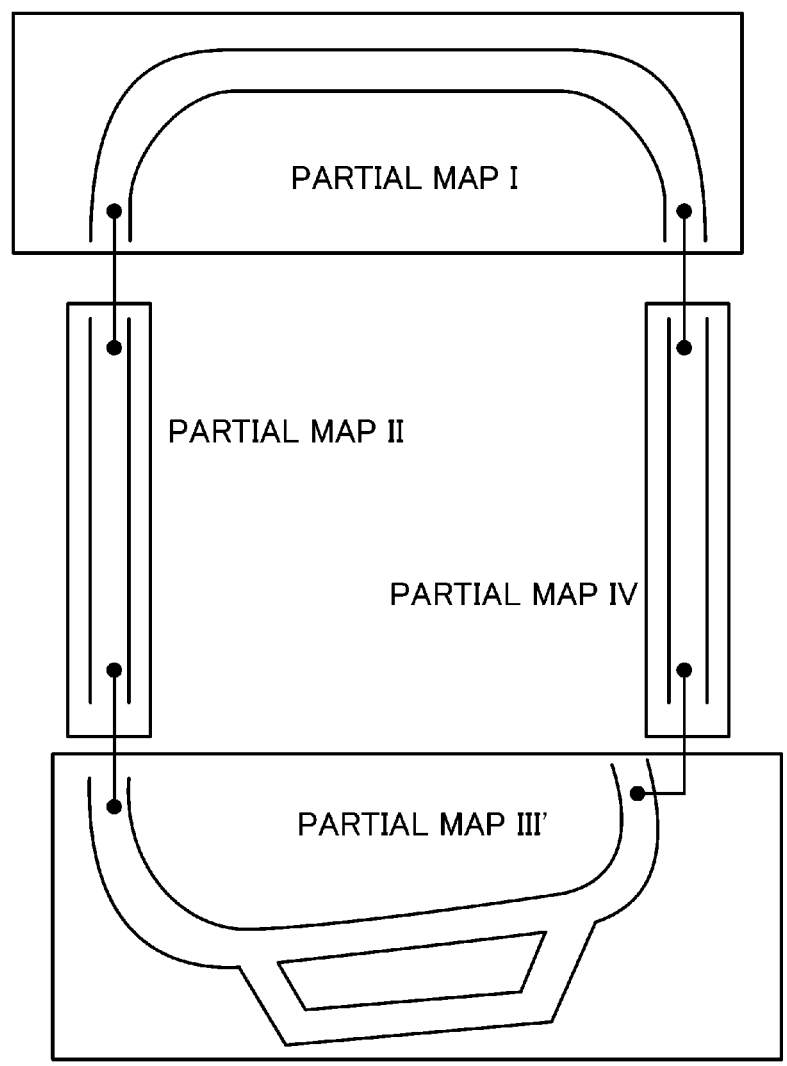
FIG. 9 is a diagram for explaining the switching of partial maps upon changing the layout.

The connecting unit 53 sets forth the connection relation between the connection points (specifically, which connection point is connected to which connection point) of the partial maps selected by the operation input unit 26 based on the user's operations. Specifically, the connecting unit 53 functions as the connecting unit according to a preferred embodiment of the present invention. Here, an example of the partial maps connected with the connection points is shown in FIG. 8. In the example shown in FIG. 8, a circular mobile area is configured from four partial maps I to IV. Moreover, one end of the partial map I and one end of the partial map II are connected with the connection points, and the other end of the partial map I and one end of the partial map IV are connected with the connection points, and the other end of the partial map II and one end of the partial map III are connected, and the other end of the partial map IV and the other end of the partial map III are connected. Moreover, an environmental map in which the partial map III was replaced according to the change in the layout of the mobile area is shown in FIG. 9. In the example shown in FIG. 9, the partial map III shown in FIG. 8 has been replaced with a partial map III'. As described above, if a portion of the layout (area of the partial map III in this case) of the mobile area is changed, such change can be dealt with by only replacing the partial map of the area where the layout was changed and then updating the connection relation.

The storage unit 52 preferably includes, for example, from the backup RAM or the like, and stores the plurality of partial maps created by the partial map creation unit 51. Moreover, the storage unit 52 includes a storage area to store the position coordinate of the connection point, connection information showing the connection relation of the connection points, and information regarding the travel route that is planned by the route planning unit 54 described later, and also stores such information.

The route planning unit 54 plans a travel route across the plurality of partial maps created by the partial map creation unit 51. More specifically, the route planning unit 54 extracts and thins each of the plurality of created partial maps, connects them with a topological map, divides them once again after searching for the shortest route on the topological map, and thereby plans the travel route for each partial map. Thus, the route planning unit 54 includes a movable area extraction unit 55, a topological map creation unit 56, a shortest route searching unit 57, a dividing unit 58, and a planning unit 59.

For each partial map, the movable area extraction unit 55 creates an extended obstacle area by extending the outline of the obstacle area included in the partial map in an amount corresponding to the radius of the autonomous mobile device 3 by using the Minkowski sum, and extracts the area excluding the extended obstacle area as the movable area where the autonomous mobile device 3 can be moved without coming in contact with an obstacle. Next, the movable area extraction unit 55 thins the extracted movable area using the Hilditch thinning method. Specifically, the movable area extraction unit 55 functions as the extraction unit according to a preferred embodiment of the present invention.

For each of the plurality of partial maps, the topological map creation unit 56 searches for branching points (nodes) of the movable area thinned by the movable area extraction unit 55, and creates a topological map representing the connection relation of the branching points. Specifically, the topological map creation unit 56 functions as the topological map creation unit according to a preferred embodiment of the present invention. Here, the topological map is a map which includes, as information, only the connection relation of the branching points and the distance between the connected branching points (specifically, it does not include coordinate information).

The shortest route searching unit 57 connects the topological maps for each partial map created by the topological map creation unit 56 with connection points, and searches for the shortest route that connects the starting point and the goal point by using the A* algorithm (A star algorithm) on the connected topological map. Specifically, the shortest route searching unit 57 functions as the search unit according to a preferred embodiment of the present invention.

The dividing unit 58 divides the shortest route searched by the shortest route searching unit 57 into a topological map for each of the plurality of partial maps. Specifically, the dividing unit 58 functions as the dividing unit according to a preferred embodiment of the present invention. Moreover, the planning unit 59 plans the travel route that connects the connection points on the topological map for each partial map that was divided by the dividing unit 58. Specifically, the planning unit 59 functions as the planning unit according to a preferred embodiment of the present invention.

The travel control unit 36 drives the electric motors 12 so that the autonomous mobile device 3 moves (is guided) according to the guide control (direction instruction) signal that is input from the joystick 21 (lever 22) during the execution of the installation mode. Meanwhile, the travel control unit 36 controls the electric motors 12 so that the autonomous mobile device 3 autonomously travels to the goal point along the travel route planned across a plurality of partial maps while avoiding obstacles during the execution of the delivery mode. Specifically, the travel control unit 36 functions as the control unit according to a preferred embodiment of the present invention.

Here, in this preferred embodiment, a virtual potential method was adopted as the control method of causing the autonomous mobile device 3 to autonomously travel along the travel route to the goal point while avoiding obstacles during the execution of the delivery mode. The virtual potential method is a method of generating a virtual gravitation potential field relative to the goal position and a virtual repulsion potential field relative to the obstacle to be avoided, and superposing these fields so that the autonomous mobile device 3 heads to the goal position while avoiding contact with the obstacles. More specifically, the travel control unit 36 foremost calculates the virtual gravitation for heading toward the goal position based on the self-location. Meanwhile, a virtual repulsion for avoiding obstacles is calculated by the obstacle avoidance control unit 38 based on the self-location, travel speed, position and speed of obstacles. Subsequently, the travel control unit 36 calculates the virtual force vector by performing vector synthesis to the obtained virtual gravitation and virtual repulsion. The travel control unit 36 controls the travel of the autonomous mobile device 3 to move to the goal point while avoiding obstacles by driving the electric motor 12 (omni wheel 13) according to the obtained virtual force vector.

Moreover, upon changing from the partial map during travel to a different partial map, the switching unit 60 switches the partial map to be used for traveling based on the connection relation between the connection points of the partial map set forth by the connecting unit 53. More specifically, upon changing to a different partial map, the switching unit 60 switches the coordinate system to be used from the coordinate system of the partial map during travel to the coordinate system of the partial map of the travel destination by using the coordinate transformation matrix shown with Formula (2) of FIG. 10. Specifically, the switching unit 60 functions as the switching unit according to a preferred embodiment of the present invention. The autonomous mobile device 3 is thereby able to autonomously travel across a plurality of partial maps.

Figure 11:
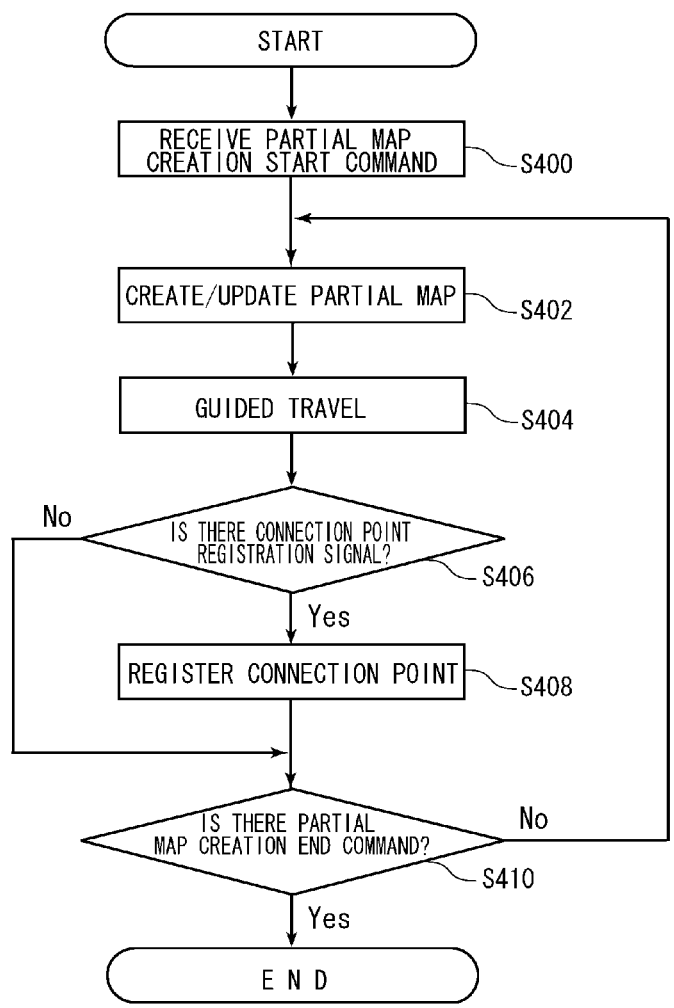
FIG. 11 is a flowchart showing the processing routine of the partial map creation processing (installation mode) performed by the autonomous mobile device according to the third preferred embodiment of the present invention.
Figure 12:
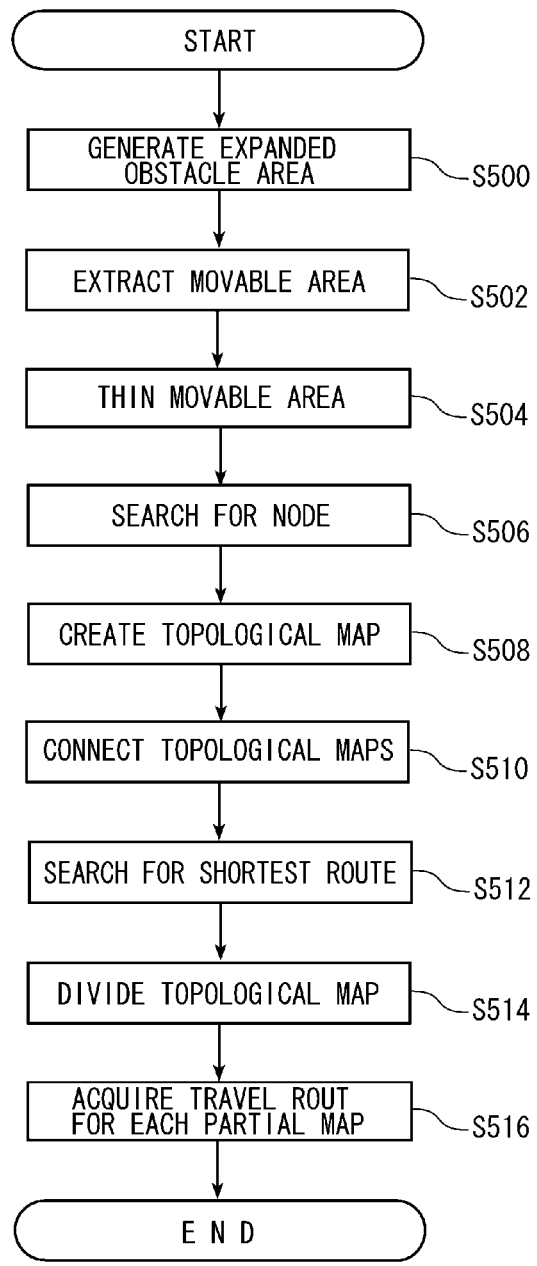
FIG. 12 is a flowchart showing the processing routine of the route planning processing performed by the autonomous mobile device according to the third preferred embodiment of the present invention.
Figure 13:
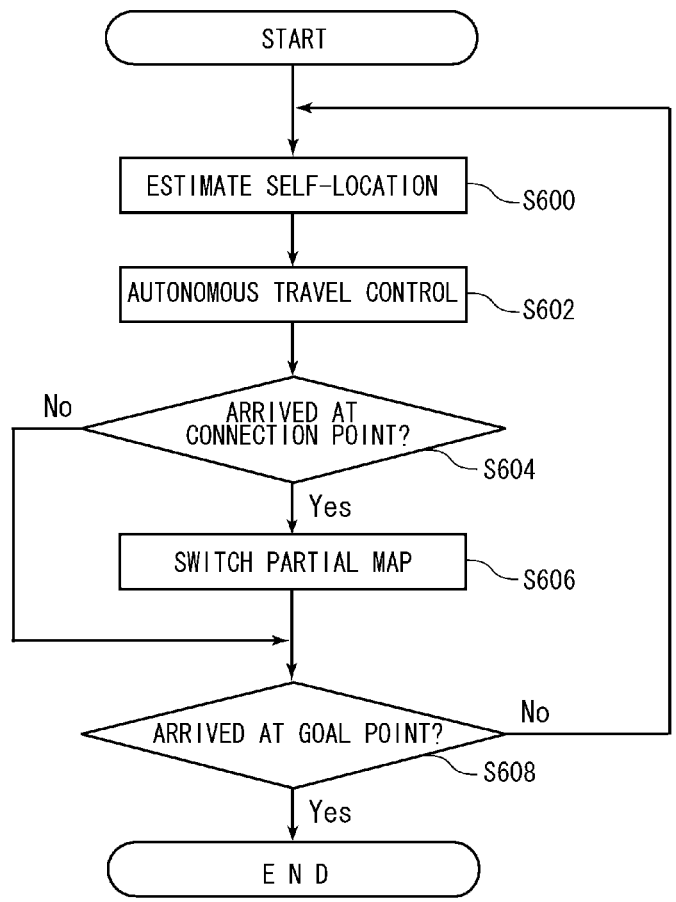
FIG. 13 is a flowchart showing the processing routine of the autonomous travel processing (delivery mode) performed by the autonomous mobile device according to the third preferred embodiment of the present invention.

The operation of the autonomous mobile device 3 is now explained with reference to FIG. 11 to FIG. 13. FIG. 11 is a flowchart showing the processing routine of the partial map creation processing (installation mode) performed by the autonomous mobile device 3. FIG. 12 is a flowchart showing the processing routine of the route planning processing performed by the autonomous mobile device 3. Moreover, FIG. 13 is a flowchart showing the processing routine of the autonomous travel processing (delivery mode) performed by the autonomous mobile device 3. The respective processes shown in FIG. 11 to FIG. 13 are mainly performed by the electronic controller 50, and are started and executed according to the user's operation.

The processing routine of the partial map creation processing (installation mode) shown in FIG. 11 is foremost explained. Note that, prior to starting the partial map creation processing, it is desirable to eliminate any movable objects placed on the guiding route as advance preparation. Moreover, when the environmental map is being created while guiding the autonomous mobile device 3, it is desirable to prevent any mobile object from entering the detection range of the laser range finder 20.

In step S400, when the partial map creation start command from the user is acceptably received, the autonomous mobile device 3 is guided and starts to move. In subsequent step S402, SLAM is used to create a partial map. Note that the method of creating the partial map is as described above, and the detailed explanation thereof is omitted.

Subsequently, in step S404, the autonomous mobile device 3 is guided and moved according to the guide control (direction instruction) signal (that is, the user's operation) input from the joystick 21 (lever 22).

Next, in step S406, whether the connection point registration signal was input from the joystick 21 (registration switch 23), is determined. Here, if the connection point registration signal was input, in step S408, the self-location at such position is registered as the position coordinate of the connection point on the partial map. Meanwhile, if the connection point registration signal was not input, the processing proceeds to step S410.

In step S410, whether the creation of all necessary partial maps is complete and whether the partial map creation end command from the user was acceptably received, are determined. Here, if the partial map creation end command was not acceptably received, the processing proceeds to step S402, and the processing of foregoing step S402 to step S408 is repeatedly executed until the partial map creation end command is acceptably received. Meanwhile, if the creation of all partial maps is complete and the partial map creation end command was acceptably received, partial map creation processing (installation mode) is ended.

The processing routine of the route planning processing shown in FIG. 12 is now explained. Foremost, in step S500, the partial maps created by the partial map creation processing are read (refer to FIG. 14), and an extended obstacle area is generated by extending the outline of the obstacle area included in the partial map in an amount corresponding to the radius of the autonomous mobile device 3 for each partial map.

Figure 15:
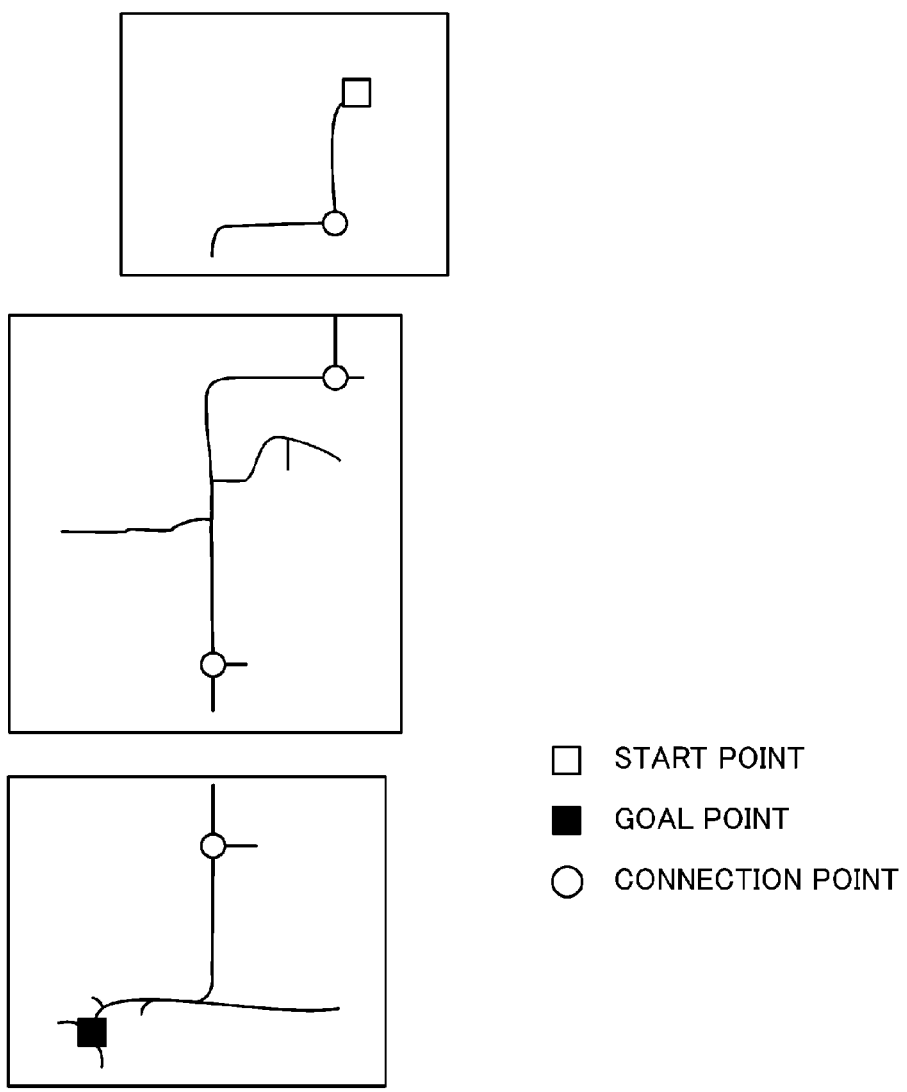
FIG. 15 is a diagram showing partial maps in which the movable area was subject to thinning.

In subsequent step S502, the area in which the extended obstacle area created in step S500 is excluded from the partial map, is extracted as the movable area where the autonomous mobile device 3 can move without coming in contact with an obstacle. Subsequently, in step S504, the thinning processing of the extracted movable area is performed (refer to FIG. 15).

Figure 16:
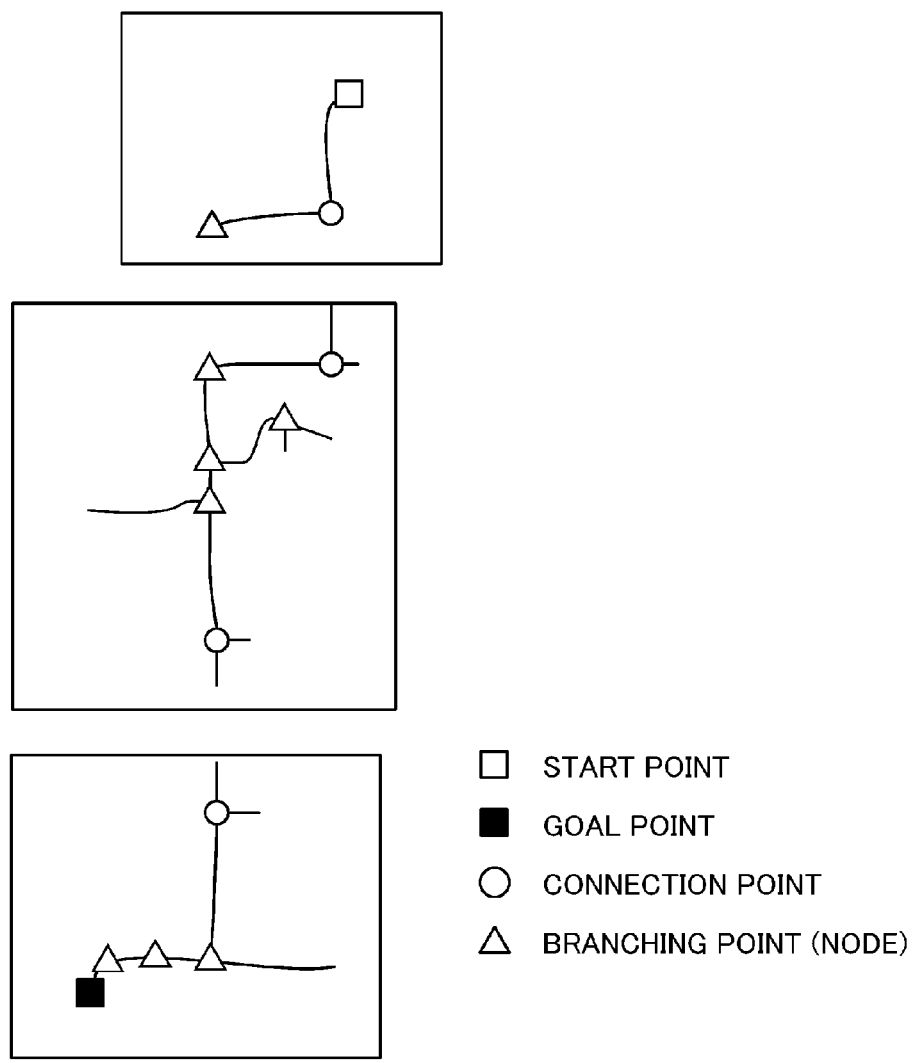
FIG. 16 is a diagram showing partial maps to which a node (branching point) search was performed.
Figure 17:
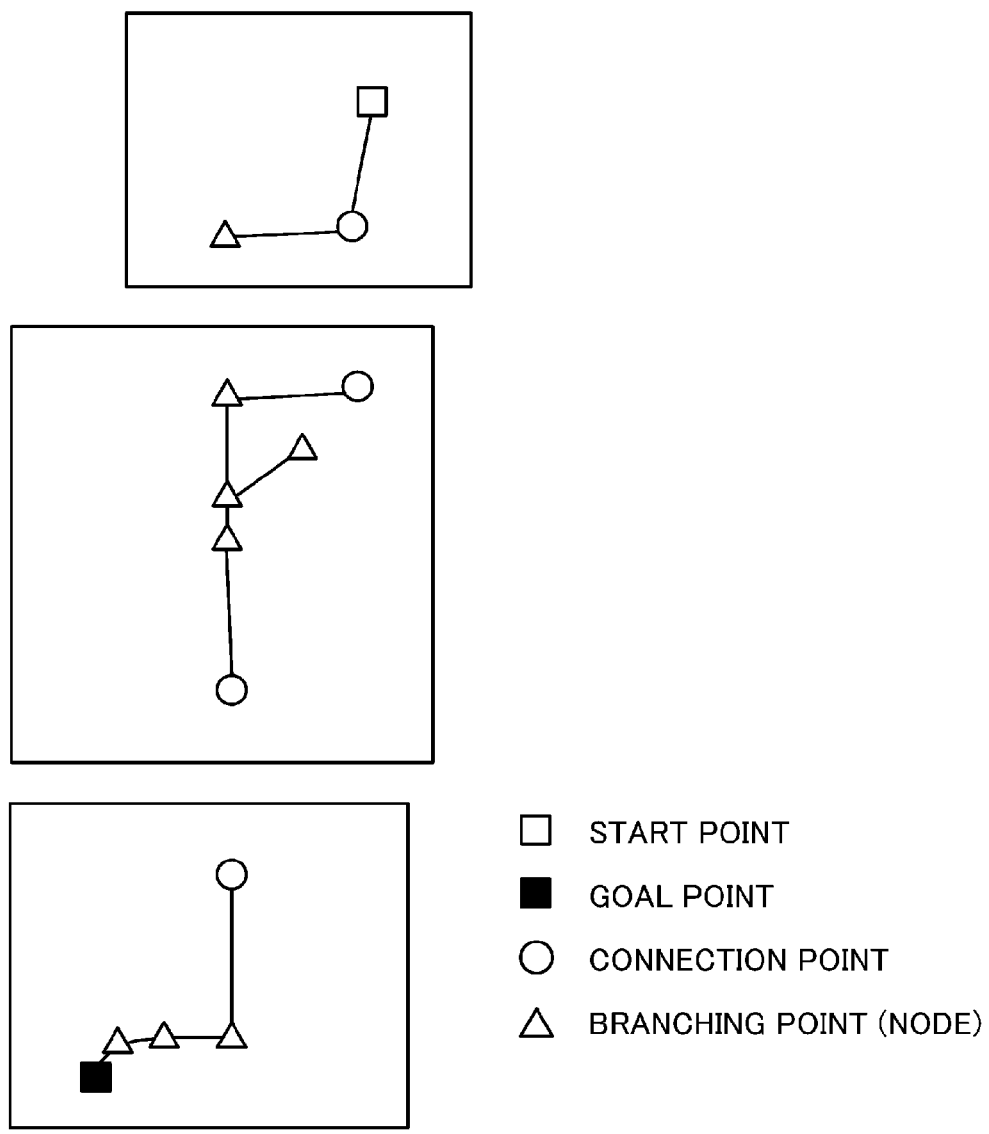
FIG. 17 is a diagram showing divided topological maps.
Figure 18:
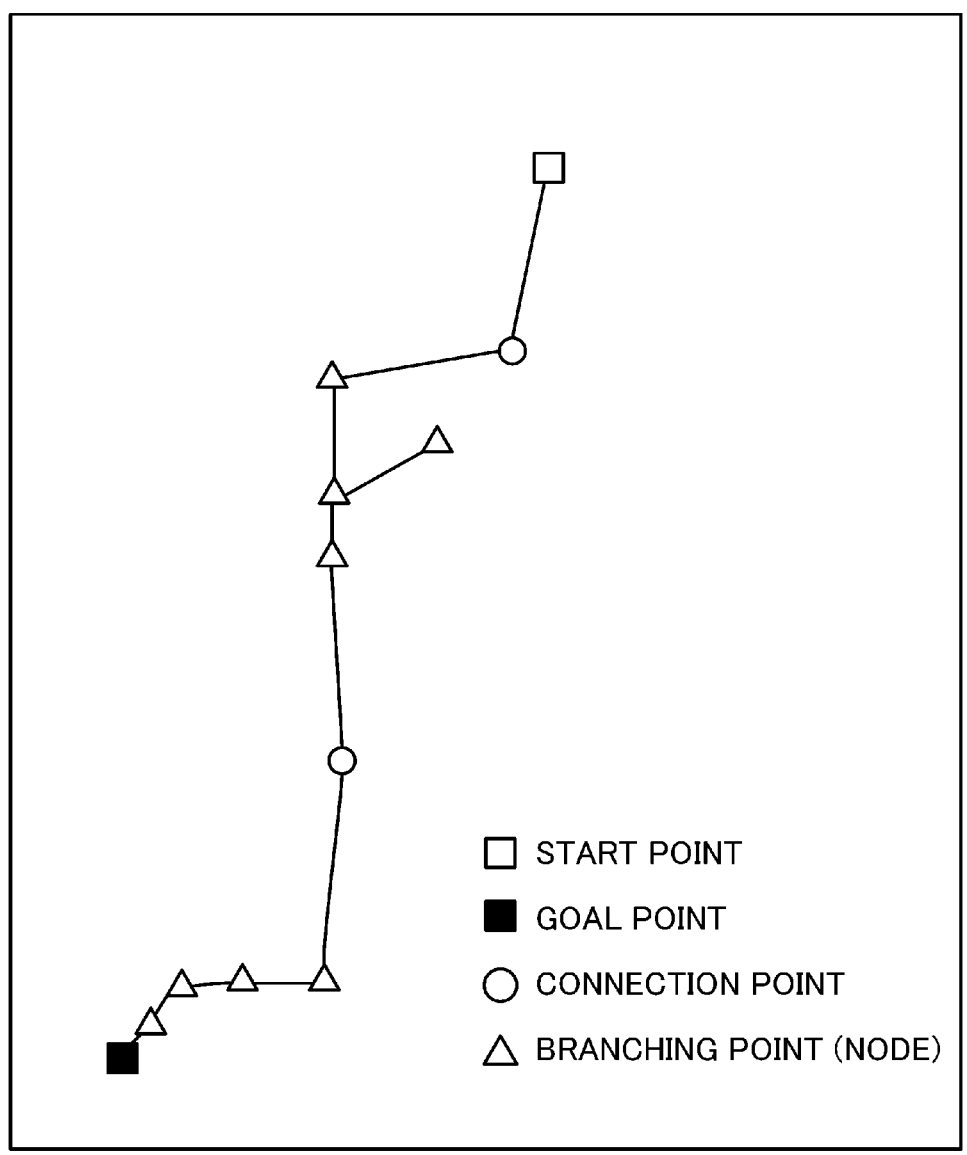
FIG. 18 is a diagram showing a connected topological map.

Next, in step S506, the branching points (nodes) of the thinned movable area are searched for each partial map (refer to FIG. 16). Subsequently, in step S508, a topological map representing the connection relation of the branching points searched in step S506 and the distance between the connected branching points, is created for each partial map (refer to FIG. 17). Next, in step S510, the topological maps of each partial map created in step S508 are connected with the selected connection points (refer to FIG. 18).

Figure 19:
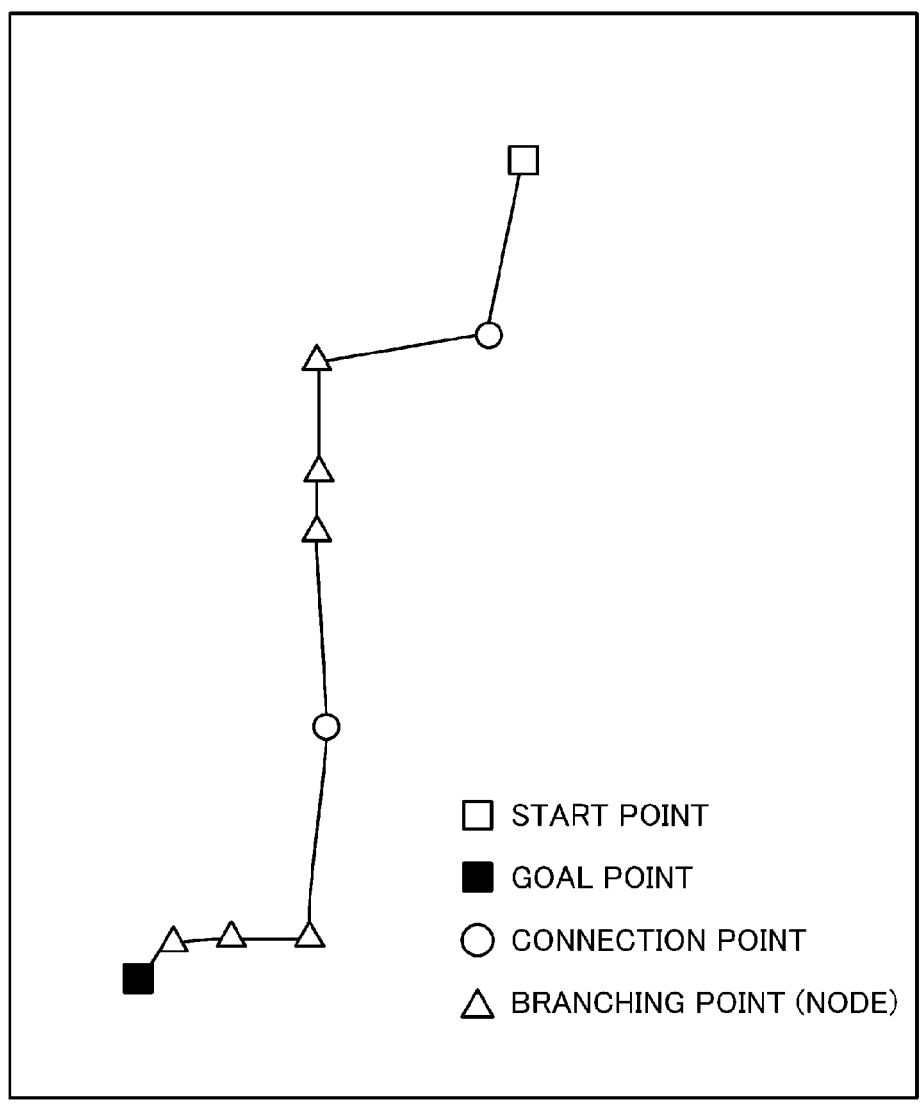
FIG. 19 is a diagram showing a topological map to which a shortest route search was performed.
Figure 20:
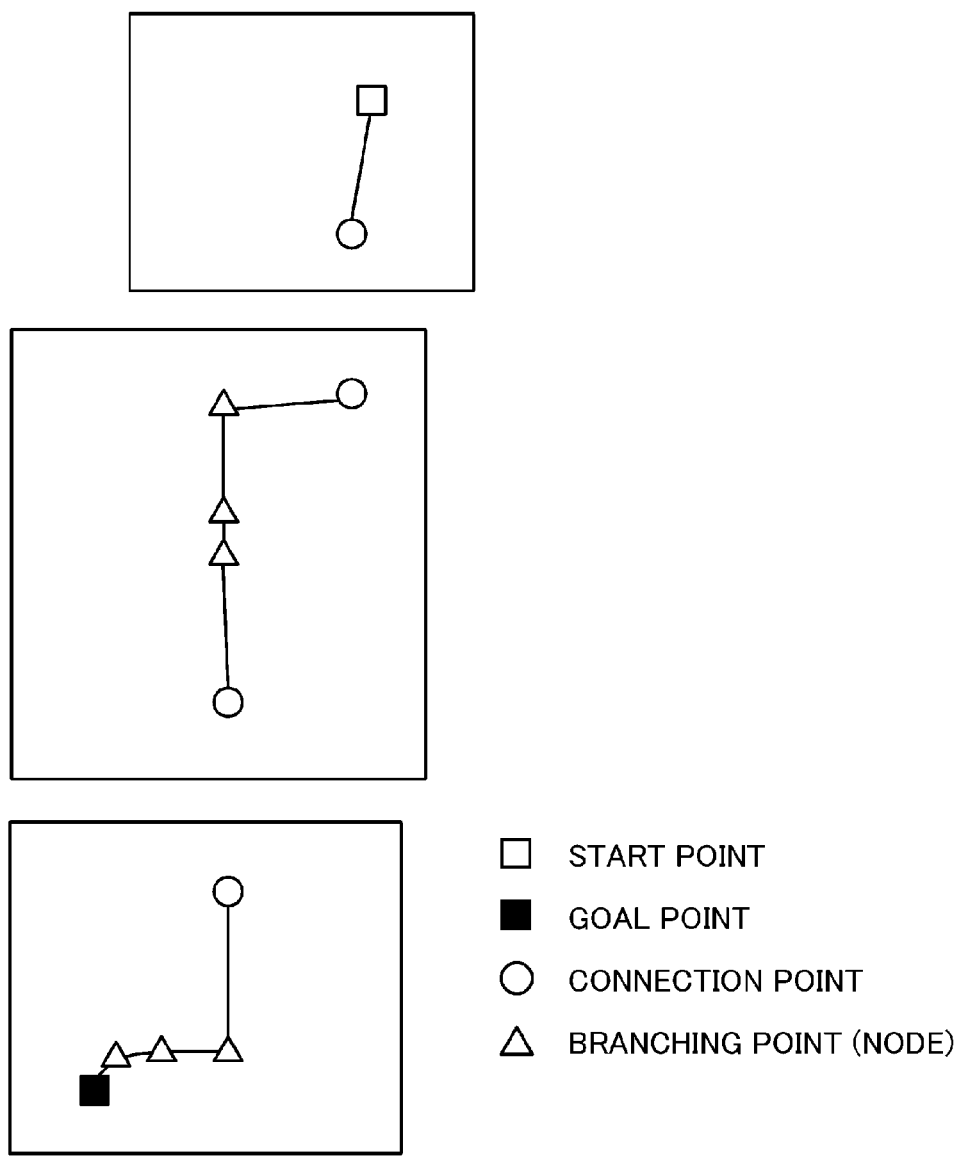
FIG. 20 is a diagram showing topological maps that were divided once again.
Figure 21:
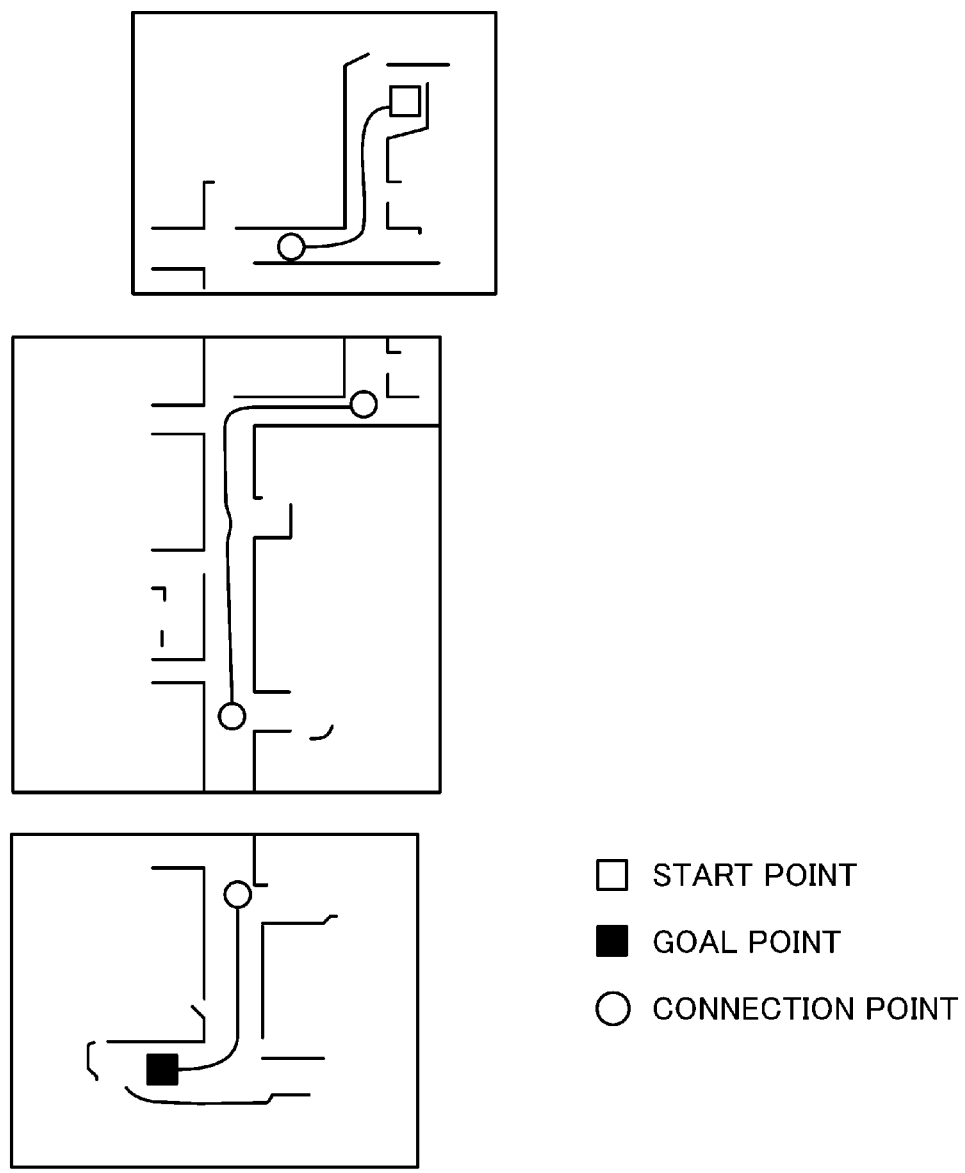
FIG. 21 is a diagram showing partial maps on which a travel route is planned.

In subsequent step S512, for example, the A* algorithm is used with the starting point and goal point provided by the user as the base points, and through which branching points on the topological map need to be traveled in order to achieve the minimum cost (shortest route) is computed (refer to FIG. 19). Subsequently, in step S514, the shortest route searched in step S512 is divided once again into the topological maps for each partial map (refer to FIG. 20). In subsequent step S516, the travel route that connects the connection points included in the topological map, and sub goal are decided for each of the partial maps divided in step S514, and route information represented as a sub goal point sequence (coordinate sequence) is acquired (refer to FIG. 21).

The processing routine of the autonomous travel processing (delivery mode) shown in FIG. 13 is now explained. Foremost, in step S600, the self-location is estimated. Specifically, the local map and the partial map are compared in consideration of the travel distance of the autonomous mobile device 3 calculated according to the angle of rotation of the respective electric motors 12 read from the encoder 16, and the self-location is estimated based on the comparison result.

Subsequently, in step S602, autonomous travel control is executed, and the electric motors 12 are controlled so as to cause the autonomous mobile device 3 to travel autonomously across partial maps to the goal point along the travel route of each partial map that was planned in the foregoing route planning processing while avoiding obstacles. As described above, in this preferred embodiment, the virtual potential method was adopted as the control method of causing the autonomous mobile device 3 to travel autonomously to the goal point along the planned travel route while avoiding obstacles. Note that the virtual potential method is as described above, and the detailed explanation thereof is omitted.

In subsequent step S604, whether the autonomous mobile device 3 has reached the vicinity of the connection point of the partial map. That is, the switching area of the partial map, is determined. More specifically, whether the autonomous mobile device 3 has reached the switching area of the partial map is determined based on whether the circle of a predetermined radius centered around the autonomous mobile device 3 (for example, this is specifically about 2 m and preferably a distance that is decided based on the valid range of sensing) and circle of a predetermined radius centered around the connection point (for example, this is specifically 2 m, and preferably a distance in which the map can be sufficiently switched when subject to a back calculation from the fastest speed that is output during travel) are overlapping. Here, if the autonomous mobile device 3 has not reached the switching area of the partial map (that is, if the circles are not overlapping), the processing proceeds to step S608. Meanwhile, if the autonomous mobile device 3 has reached the switching area of the partial map (that is, if the circles are overlapping), the processing proceeds to step S606.

In step S606, the partial map to be used is switched, with the processing of switching the coordinate system to be used from the coordinate system of the partial map during travel to the coordinate system of the partial map of the travel destination through the coordinate transformation matrix (refer to Formula (2) of FIG. 10). The processing thereafter proceeds to step S608. Note that, if the travel control of the autonomous mobile device 3 is performed with the targets that are successively set based on a plurality of sub goals from the present location onward as the goals in order to achieve smooth movement, the overlapping interval in which the sub goal point sequence in the vicinity of the connection points is held in both the partial map during travel and the partial map of the travel destination is set, a boundary line is set in the vicinity of the connection points during travel, and the map is switched when the autonomous mobile device 3 crosses that boundary line.

In step S608, whether the autonomous mobile device 3 reached the goal point upon crossing a plurality of partial maps, is determined. Here, if the autonomous mobile device 3 has not reached the goal point, the processing proceeds to step S600, and the processing of foregoing steps S600 to S606 is repeatedly executed until the autonomous mobile device 3 reaches the goal point. Meanwhile, if the autonomous mobile device 3 has reached the goal point, the autonomous travel processing (delivery mode) is ended.

According to this preferred embodiment, a plurality of independent partial maps is created, and connection points are set upon creating the partial maps. Subsequently, the connection points for connecting the partial maps are selected, and the connection relation between the connection points is set forth. Accordingly, since the accumulation of errors can be inhibited by dividing the environmental map of the overall mobile environment into independent partial maps, it is possible to resolve the inconsistency of the environmental map caused by the accumulation of errors. Moreover, since a connection relation between the connection points included in the partial map is set forth in the respective partial maps, it is possible to change to a different partial map according to the foregoing connection relation.

In addition, according to this preferred embodiment, since the environmental map of the overall mobile environment is managed by being dividing into partial maps, if the layout of the mobile area is partially changed, it is possible to recreate only the partial map in which the layout was changed and replaced only the recreated partial map. Accordingly, it is possible to flexibly deal with partial changes to the layout of the mobile area.

According to this preferred embodiment, the connection relation of the branching points (nodes) of the thinned movable area is represented as a topological map for each partial map, and the topological maps that were created for each partial map are connected. Consequently, the overall mobile area is represented as a single topological map. Here, since the topological map is a map which includes, as information, only the connection relation of the branching points and the distance between the connecting branching points (specifically, it does not include coordinate information), even if they are connected, they will not be affected by the distortion caused by measurement errors. Subsequently, after the search for the shortest route is executed using the connected topological map, the topological map is once again divided for each partial map, and the travel route is planned according to the searched shortest route. Consequently, it is possible to plan the shortest travel route across a plurality of partial maps.

According to this preferred embodiment, upon autonomously traveling along a travel route across a plurality of partial maps, the partial map is switched based on the connection relation between the partial maps when changing from the partial map during travel to a different partial map. Accordingly, it is possible to autonomously travel to the destination (goal point) across a plurality of partial maps.

According to this preferred embodiment, upon changing to a different partial map, switching is performed from the coordinate system of the partial map during travel to the coordinate system of the partial map of the travel destination. Accordingly, it is possible to change from the partial map during travel to the partial map of the travel destination.

Figure 22:
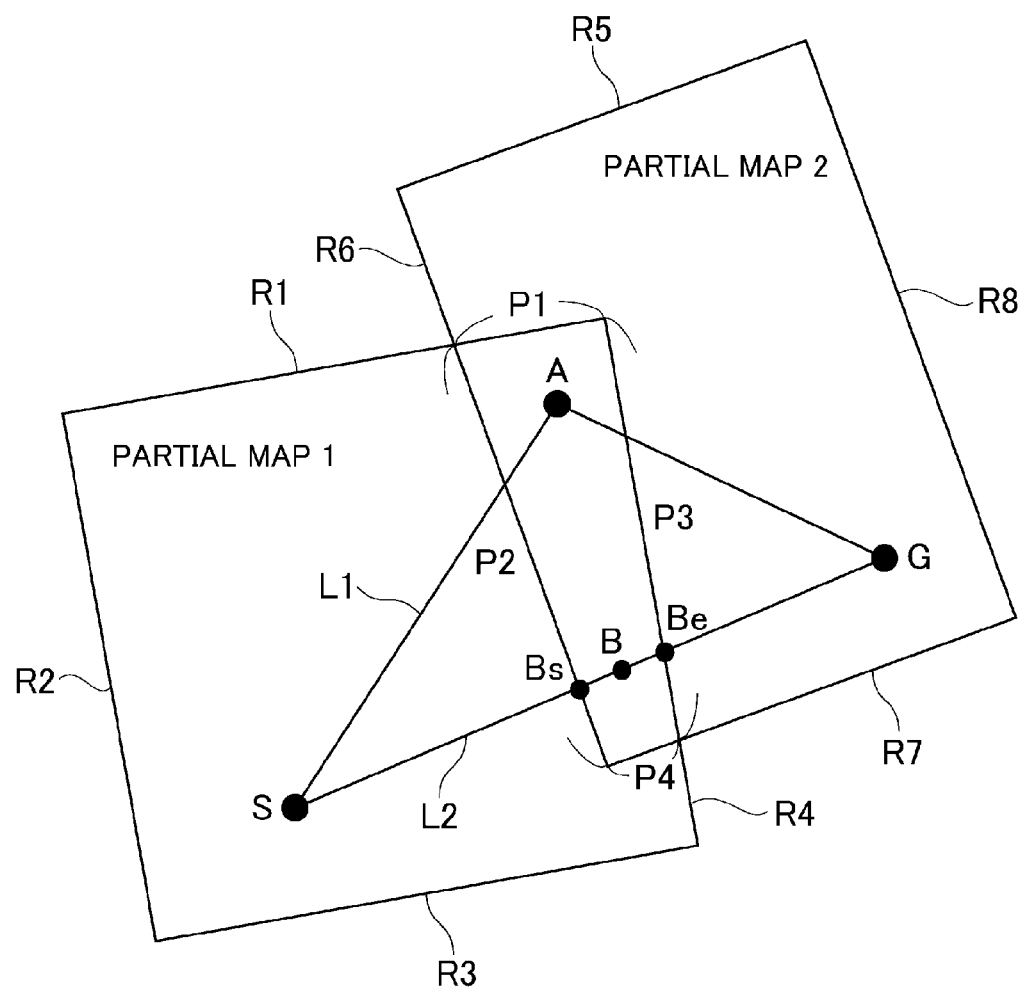
FIG. 22 is a diagram for explaining the optimization of connection points.

In this preferred embodiment, although the connection point set by the user was used as is upon planning the travel route, the configuration which is further provided with a connection point optimization unit to optimize the position of the connection points set by the autonomous mobile device 3, may be used. In this case, the connection point optimization processing (step S505) explained below is executed between step S504 and step S506 described above. Here, the connection point optimization processing is explained with reference to FIG. 22. Note that, in FIG. 22, "A" represents the connection point that was prepared in advance based on the user's input or the like, "B" represents the optimized connection point, "S" represents the starting point, "G" represents the goal point, "L1" represents the tentative travel route that passes through the connection point A, "L2" represents the optimal travel route, "R1 to R8" represent the boundary line of the respective maps, and "P1 to P4" represent the boundary line of the overlapping areas.

In step S505, the connection points B are obtained according to the following routine.

(1) The partial map 2 is converted into the coordinate system of the partial map 1 to prepare a temporary map of partial map 1+partial map 2.

(2) The tentative travel route L1 that passes through the connection point A on the temporary map is calculated.

(3) The optimal route L2 is decided with an optimization method (well known method or the linearization method or smoothing method described in Japanese Patent Application No. 2008-231519).

(4) The connection point is substituted in the overlapping area of the partial map 1 and the partial map 2 on the optimal route L2, and it is set as the connection point B.

Here, the algorithm for deciding the connection point B is explained in further detail. An intersection points Bs of the optimal route L2 and the boundary line R6 is set as the start, an inter section points Be of the optimal route L2 and the boundary line R4 is set as the end, and the connection point B are decided by repeating the following routine in intervals of predetermined steps among the intersection point Bs to intersection point Be.

(5) As the nth step, a straight line that passes through the connection points candidate B(n) and which is parallel with the boundary line R1 is drawn, the intersection points of this straight line and the respective boundary lines R1 to R8 are obtained, the length of the segment connecting the respective intersection points and B(n) is obtained, and the value of the smallest segment among the segments is held.

(6) The processing of (5) above is performed to the area lines R2 to R8, and the value h(n) that is smallest among the 8 minimal values is held.

(7) Proceeding to the n+1st step, the processings of (5) and (6) above are performed to the subsequent connection point candidate B(n+1), and the minimal value h(n+1) of the segment is held.

(8) h(n) and h(n+1) are compared, and the larger value is rewritten as h(n+1) and held.

(9) By repeating the processing of (5) to (8) above for each predetermined step from Bs to Be, point B(n) which is generally separated from the respective boundary lines P1 to P4 of the overlapping area is calculated, and this is set as the new connection point B. As result of the foregoing processing, it is possible to obtain the (optimized) connection point B on the optimal route L2 which are generally separated from the respective boundary line P1 to P4 of the overlapping area. Note that, after the connection points are replaced, the optimized connection points are used to perform the processing of step S506 onward described above.

Preferred embodiments of the present invention were explained above, but the present invention is not limited to the foregoing preferred embodiments, and can be modified variously. For example, although a joystick 21 was preferably used as the input device for remotely operating the autonomous mobile device 3 in the foregoing preferred embodiments, other forms of remote controllers may be used so as long as it is able to guide the autonomous mobile device 3 and register a connection point.

Although the partial map was preferably created (connection point was set and selected) based on the user's operation in the foregoing preferred embodiments, a configuration of automatically creating the partial map may also be adopted. For example, upon creating the partial map, the subsequent new partial map may be automatically created by using, as the trigger, for example, the travel distance of the autonomous mobile device, the area of the partial map, and/or the sensor input (for example, upon detecting a marker disposed near the connection points with a camera). Here, thresholds of the travel distance of the autonomous mobile device and the area of the partial map to be used as the trigger can be decided according to the level of accumulated errors during the creation of the map of the sensor system of the autonomous mobile device. Moreover, in case of automatically creating the subsequent new partial map, it is possible to set the current positional posture in the existed partial map and the positional posture of the original point in the new partial map as the connection points, select these two points as one set, and use this for switching the map.

Although a touch screen 24 configured integrally with a display unit 25 and an operation input unit 26 was preferably used in the foregoing preferred embodiments, a configuration of using a standard display as the display unit and using a keyboard, mouse or the like as the operational input unit may also be adopted.

Although the distance to the obstacle was preferably measured using a laser range finder 20 in the foregoing preferred embodiments, configuration using a stereo camera, ultrasonic sensor or the like in substitute for or in addition to the laser range finder may also be adopted.

Although an omni wheel 13 capable of moving omni-directionally was preferably used in the foregoing preferred embodiments, a configuration using a standard wheel (steering wheel and drive wheel) may also be adopted.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. An autonomous mobile device, comprising:
an object information acquisition unit to acquire position information on an object existing near autonomous mobile device;
a local map creation unit to create a local map of surroundings of the autonomous mobile device based on the position information on the object acquired by the object information acquisition unit;
a moving unit to move the autonomous mobile device;
a self-location estimation unit to estimate a self-location based on the local map created by the local map creation unit and a travel distance of the moving unit;
a guiding unit to guide the autonomous mobile device by driving the moving unit based on an operation of a user;
an environmental map creation unit to create an environmental map of a mobile area, during the guiding by the guiding unit, based on the self-location estimated by the self-location estimation unit and the local map;
a teaching unit to teach to register, during the guiding by the guiding unit, the self-location of the autonomous mobile device when the autonomous mobile device is positioned at a predetermined setting point as a position coordinate of the setting point;
a storage unit to store the environmental map and the setting point;
a route planning unit to plan a travel route by using the setting point on the environmental map stored in the storage unit;
a control unit to control the moving unit so that the autonomous mobile device autonomously travels along the travel route planned by the route planning unit;
a differential map creation unit to create a differential map showing an object change level within the mobile area, upon the autonomous traveling along the travel route; and
a dynamic environmental map creation unit to create a dynamic environmental map based on an addition result of the differential map created by the differential map creation unit and the environmental map, upon the autonomous traveling along the travel route; wherein
the self-location estimation unit compares each of the environmental map and the dynamic environmental map with the local map, and estimates the self-location based on the comparison result, upon the autonomous traveling along the travel route; and
the differential map creation unit updates the differential map based on the addition result of the dynamic envi- ronmental map and the local map, and the difference with regard to the environmental map.

2. The autonomous mobile device according to claim 1, wherein the teaching unit teaches, together with the registration of the setting point, to register attribute information on the setting point.

* * * * *